(12) United States Patent
Chelminski

(10) Patent No.: US 10,031,245 B2
(45) Date of Patent: Jul. 24, 2018

(54) DEVICE FOR MARINE SEISMIC EXPLORATIONS FOR DEPOSITS

(71) Applicant: Stephen Chelminski, Antrim, NH (US)

(72) Inventor: Stephen Chelminski, Antrim, NH (US)

( * ) Notice: Subject to any disclaimer, the term of this patent is extended or adjusted under 35 U.S.C. 154(b) by 779 days.

(21) Appl. No.: 14/589,673

(22) Filed: Jan. 5, 2015

(65) Prior Publication Data

US 2015/0129349 A1    May 14, 2015

Related U.S. Application Data

(63) Continuation-in-part of application No. 14/187,309, filed on Feb. 23, 2014, now Pat. No. 8,971,152.

(60) Provisional application No. 61/791,342, filed on Mar. 15, 2013, provisional application No. 61/768,496, filed on Feb. 24, 2013.

(51) Int. Cl.
    G01V 1/38    (2006.01)
    G01V 1/137   (2006.01)

(52) U.S. Cl.
    CPC ............... *G01V 1/137* (2013.01); *G01V 1/38* (2013.01)

(58) Field of Classification Search
    USPC ........................................................ 367/144
    See application file for complete search history.

(56) References Cited

U.S. PATENT DOCUMENTS

| | | | | |
|---|---|---|---|---|
| 3,249,177 A * | 5/1966 | Chelminski | ............ | G01V 1/137 181/118 |
| 3,310,128 A * | 3/1967 | Chelminski | ............ | G01V 1/047 181/114 |
| 3,376,723 A * | 4/1968 | Chelminski | ............ | B21D 26/06 227/130 |
| 3,379,273 A * | 4/1968 | Chelminski | ............ | G01V 1/137 181/118 |
| 3,506,085 A * | 4/1970 | Loper | ............ | G01V 1/137 181/118 |
| 3,548,630 A * | 12/1970 | Chelminski | ............ | B21D 22/12 72/430 |
| 3,613,824 A * | 10/1971 | Loper | ............ | G01V 1/137 181/120 |
| 3,646,598 A * | 2/1972 | Chelminski | ............ | E02D 7/00 114/295 |
| 3,653,460 A * | 4/1972 | Chelminski | ............ | G01V 1/137 181/120 |
| 3,657,917 A * | 4/1972 | Chelminski | ............ | B21J 5/04 425/77 |

(Continued)

OTHER PUBLICATIONS

International Search Report dated May 26, 2014 from corresponding International Application PCT/US2014/017875.

(Continued)

*Primary Examiner* — James R Hulka
(74) *Attorney, Agent, or Firm* — Z IP Law PLLC

(57) ABSTRACT

An air gun for use in generating seismic energy impulses operable at pressures below 1000 psi that reduces high frequencies and cavitation around the discharge of the air gun in order to mitigate damage to the marine environment, the air gun providing a sliding seal at the firing piston, an extension of port widths beyond the diameter of the firing piston and capability to control the speed of the shuttle assembly to reduce and eliminate some of the possible causes of the objectionable high frequencies and cavitation.

37 Claims, 24 Drawing Sheets

(56) References Cited

U.S. PATENT DOCUMENTS

| | | | | |
|---|---|---|---|---|
| 3,707,848 | A * | 1/1973 | Chelminski | E02D 3/103 405/237 |
| 3,779,335 | A * | 12/1973 | Chelminski | G01V 1/047 181/114 |
| 3,793,844 | A * | 2/1974 | Chelminski | E02D 3/103 405/238 |
| 3,800,907 | A * | 4/1974 | Chelminski | G01V 1/047 181/119 |
| 3,808,822 | A * | 5/1974 | Chelminski | E02D 3/103 181/119 |
| 3,808,823 | A * | 5/1974 | Chelminski | E02D 3/103 405/237 |
| 3,817,335 | A * | 6/1974 | Chelminski | E02D 7/10 173/127 |
| 3,958,647 | A * | 5/1976 | Chelminski | E02D 7/02 173/127 |
| 3,997,021 | A * | 12/1976 | Chelminski | G01V 1/137 175/1 |
| 4,038,630 | A * | 7/1977 | Chelminski | G01V 1/006 181/110 |
| 4,108,271 | A * | 8/1978 | Chelminski | G01V 1/047 181/117 |
| 4,210,222 | A * | 7/1980 | Chelminski | G01V 1/137 181/107 |
| 4,234,052 | A * | 11/1980 | Chelminski | G01V 1/137 181/111 |
| 4,240,518 | A * | 12/1980 | Chelminski | G01V 1/04 181/107 |
| 4,266,844 | A * | 5/1981 | Chelminski | H01R 13/523 439/453 |
| 4,271,924 | A * | 6/1981 | Chelminski | G01V 1/137 181/120 |
| 4,316,521 | A * | 2/1982 | Chelminski | G01V 1/09 181/114 |
| 4,472,794 | A * | 9/1984 | Chelminski | G01V 1/137 181/118 |
| 4,597,464 | A * | 7/1986 | Chelminski | G01V 1/006 181/114 |
| 4,599,712 | A * | 7/1986 | Chelminski | G01V 1/006 181/118 |
| 4,608,675 | A * | 8/1986 | Chelminski | G01V 1/047 181/114 |
| 4,712,202 | A * | 12/1987 | Chelminski | G01V 1/137 181/118 |
| 4,712,641 | A * | 12/1987 | Chelminski | G01V 1/047 181/113 |
| 4,713,800 | A | 12/1987 | Russell | |
| 4,723,230 | A * | 2/1988 | Chelminski | E21B 17/028 181/110 |
| 4,739,859 | A * | 4/1988 | Delano | G01V 1/047 181/119 |
| 4,754,443 | A * | 6/1988 | Chelminski | G01V 1/137 15/406 |
| 4,757,482 | A * | 7/1988 | Fiske, Jr. | G01V 1/006 174/101.5 |
| 4,779,245 | A * | 10/1988 | Chelminski | G01V 1/137 181/120 |
| 4,798,261 | A * | 1/1989 | Chelminski | G01V 1/137 181/120 |
| 4,858,718 | A * | 8/1989 | Chelminski | E21B 47/011 181/106 |
| 4,939,704 | A * | 7/1990 | Chelminski | G01V 1/135 181/106 |
| 5,315,917 | A * | 5/1994 | Mayzes | G01V 1/137 367/120 |
| 5,331,607 | A | 7/1994 | Roessler | |
| 5,432,757 | A * | 7/1995 | Chelminski | G01V 1/137 181/120 |
| 5,615,170 | A * | 3/1997 | Chelminski | G01V 1/137 181/120 |
| 5,978,316 | A * | 11/1999 | Ambs | G01V 1/135 181/120 |
| 6,116,515 | A * | 9/2000 | Chelminski | A63C 19/10 239/14.1 |
| 6,464,035 | B1 * | 10/2002 | Chelminski | G01V 1/135 181/114 |
| 6,612,396 | B1 * | 9/2003 | Chelminski | G01V 1/053 181/113 |
| 7,269,099 | B2 * | 9/2007 | Jensen | F41B 11/00 367/144 |
| 7,321,527 | B2 | 1/2008 | Hopperstad et al. | |
| 7,434,988 | B1 | 10/2008 | Kychakoff et al. | |
| 8,223,591 | B2 * | 7/2012 | Chelminski | G01V 1/116 124/56 |
| 8,971,152 | B2 * | 3/2015 | Chelminski | G01V 1/137 181/120 |
| 2006/0021609 | A1 * | 2/2006 | Jensen | F41B 11/00 124/56 |
| 2007/0140059 | A1 | 6/2007 | Guuion et al. | |
| 2008/0019214 | A1 * | 1/2008 | Pramik | G01V 1/3861 367/16 |
| 2010/0320027 | A1 | 12/2010 | Chelminski | |
| 2014/0103135 | A1 * | 4/2014 | Chelminski | F41B 9/0037 239/11 |
| 2014/0238772 | A1 * | 8/2014 | Chelminski | G01V 1/137 181/119 |

OTHER PUBLICATIONS

International Preliminary Report on Patentability with Written Opinion from corresponding International Application PCT/US2014/017875.

* cited by examiner

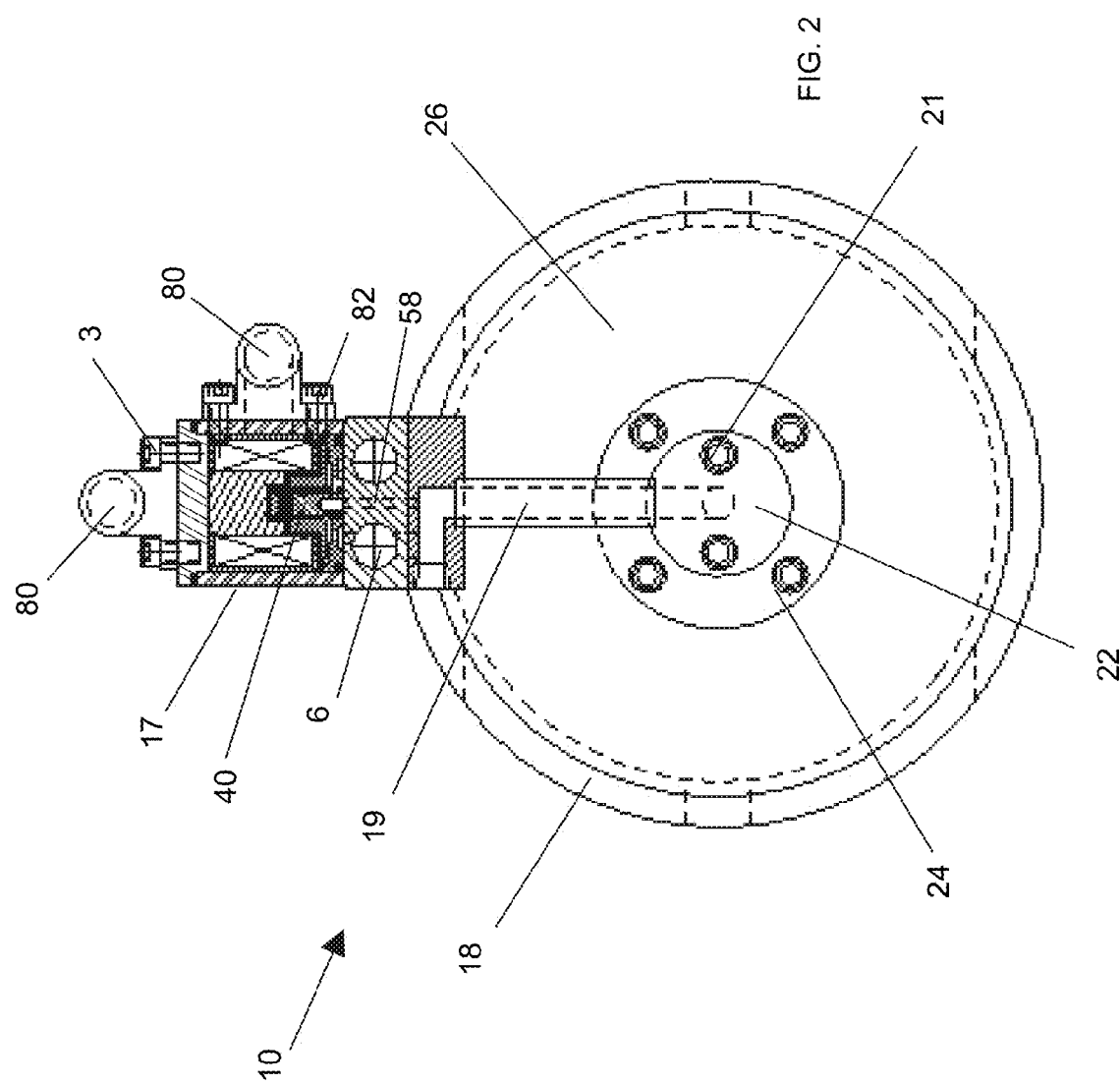

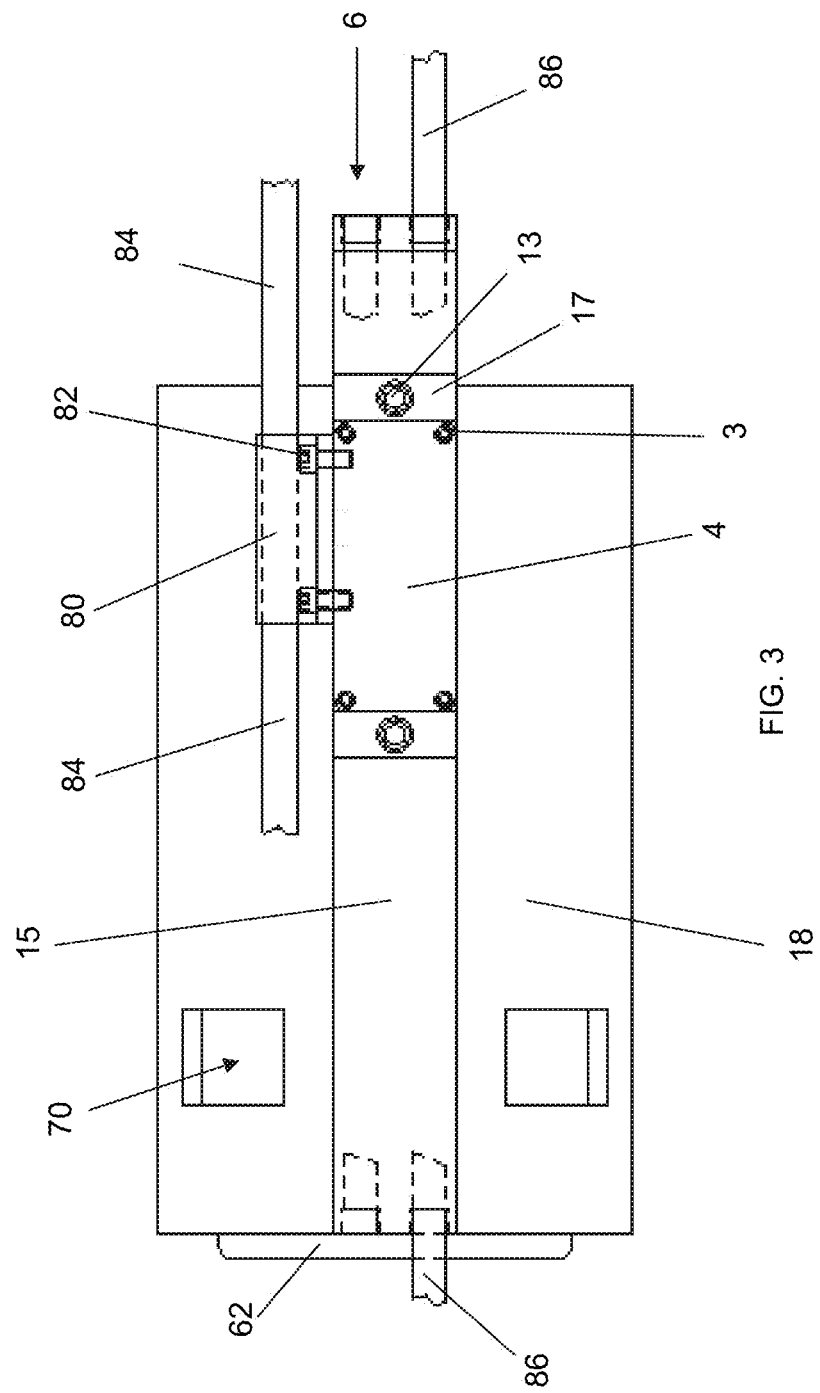

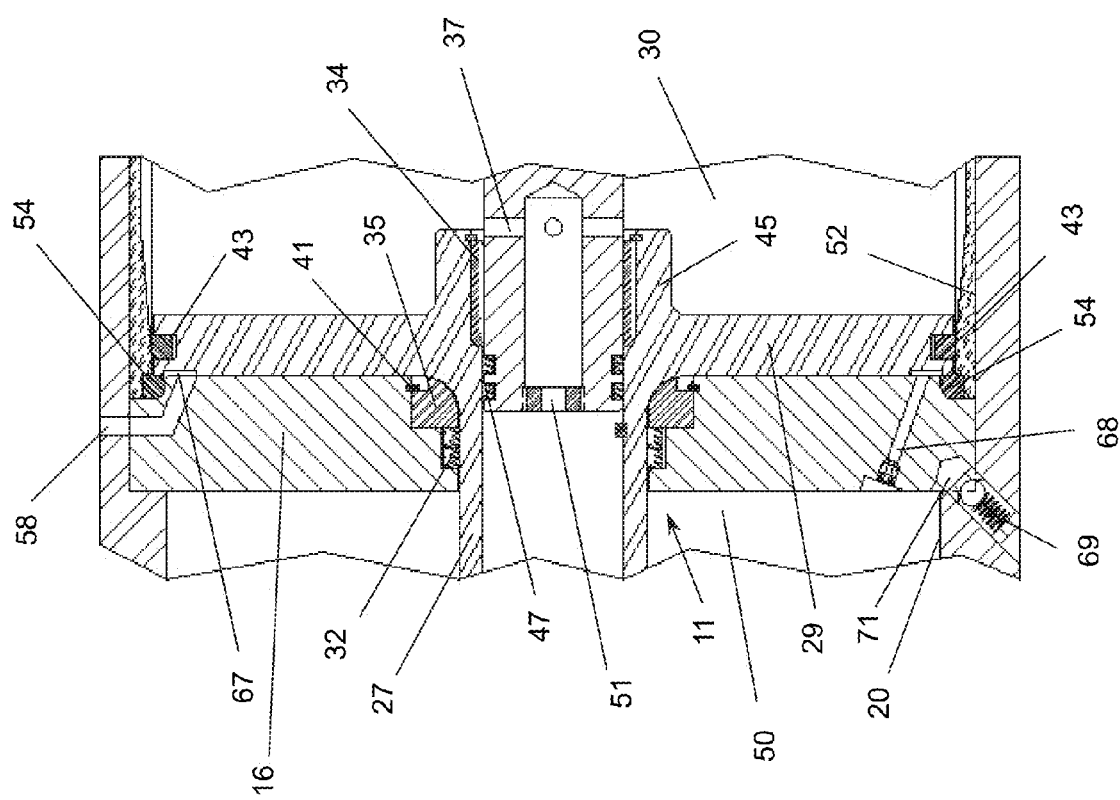

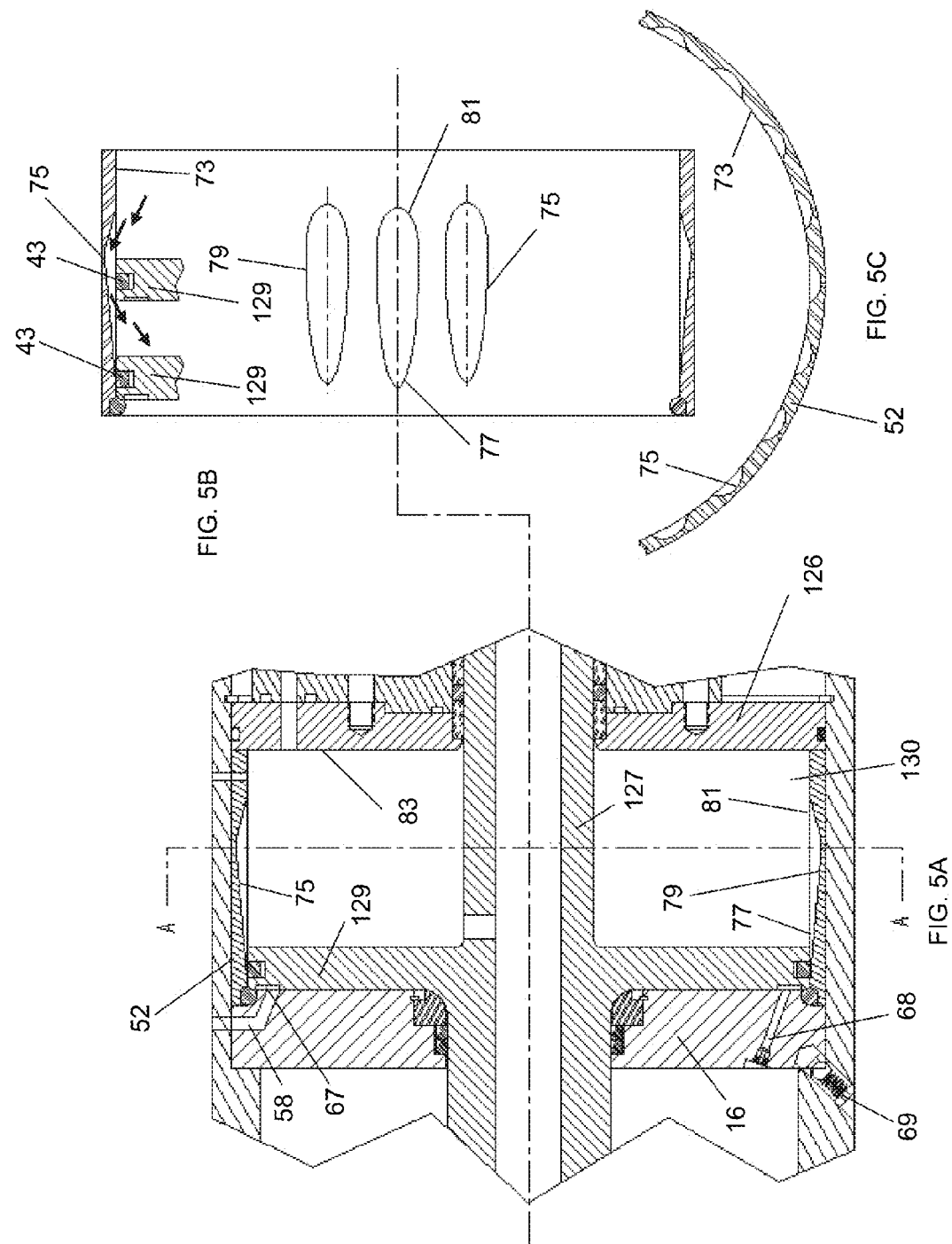

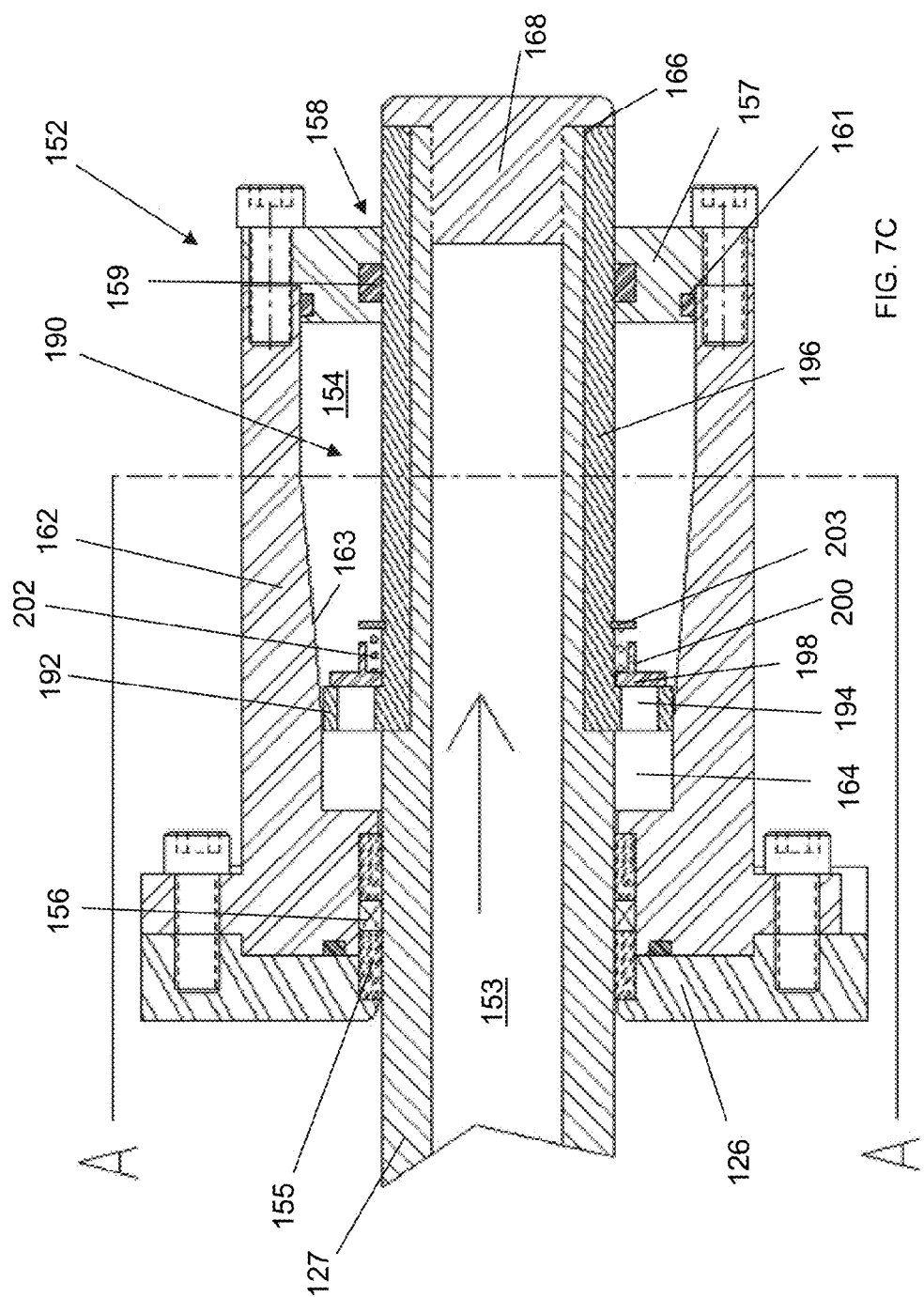

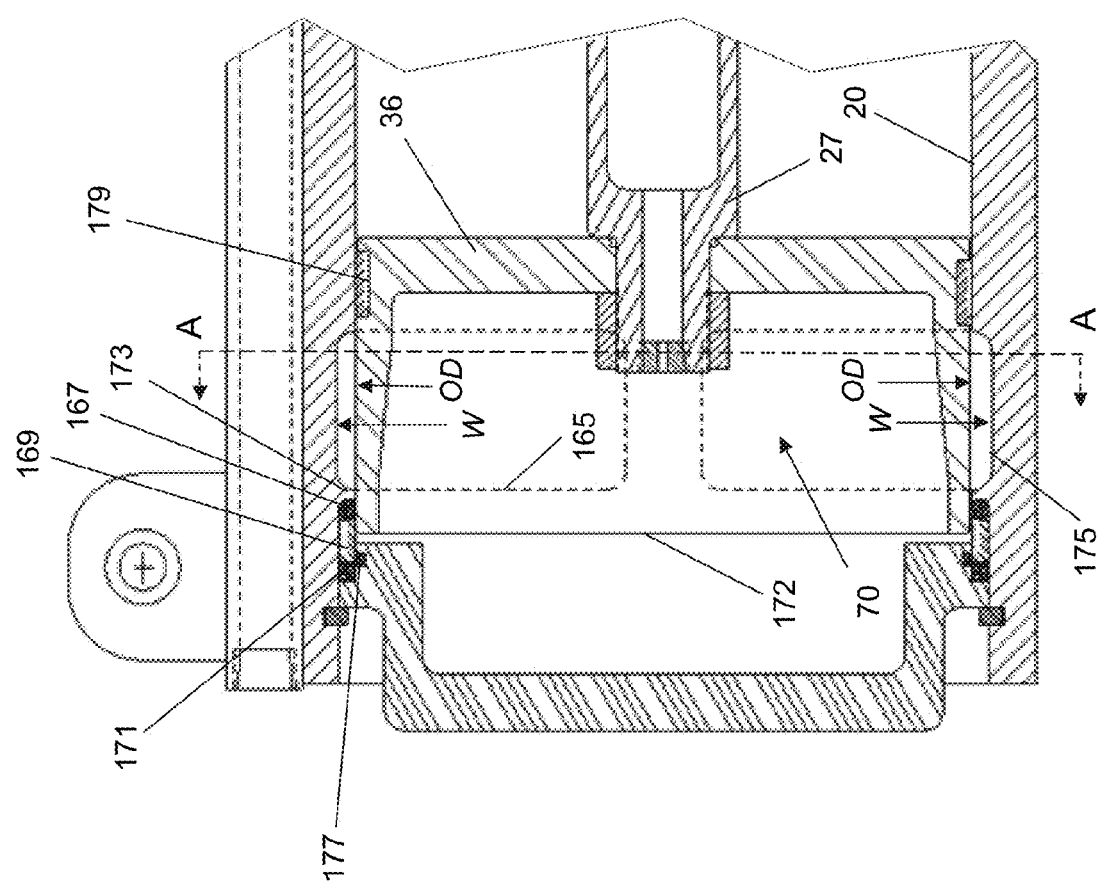

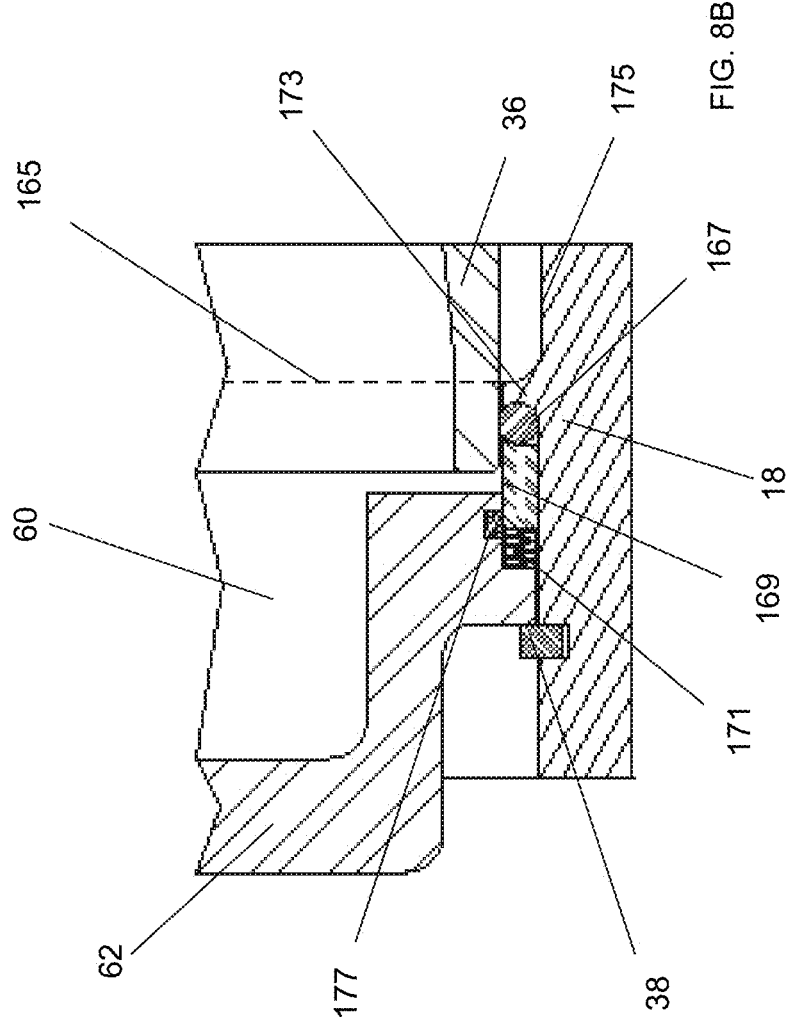

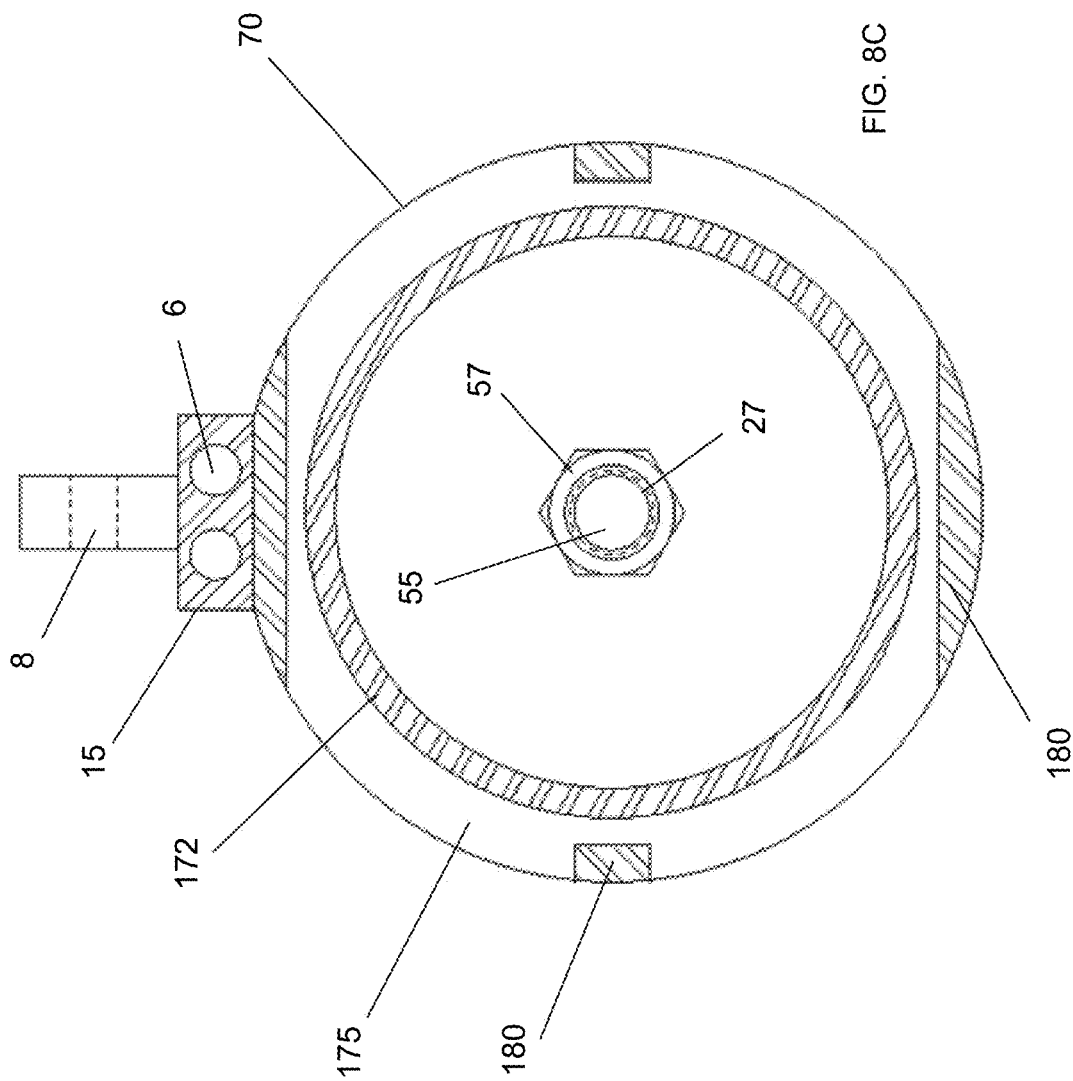

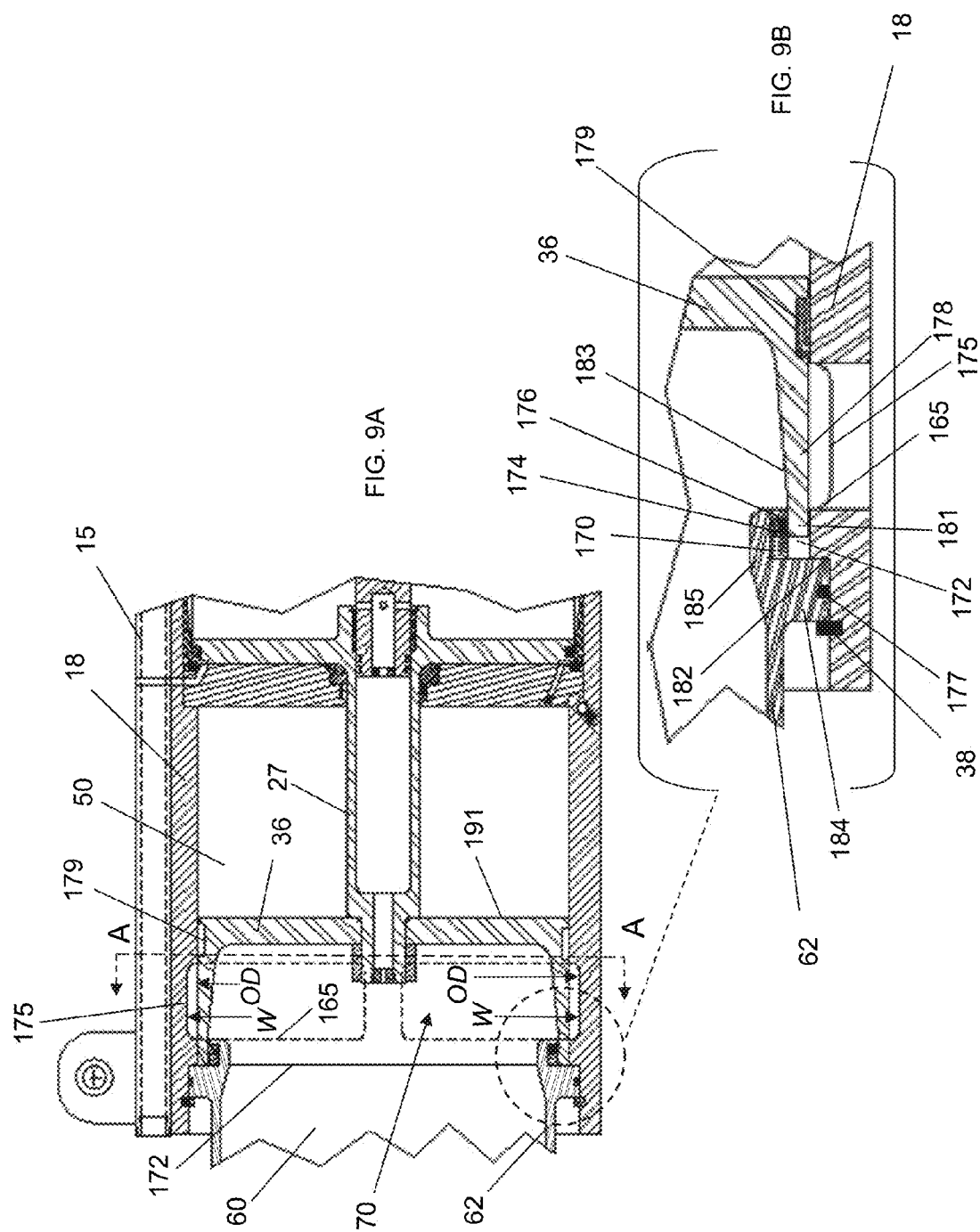

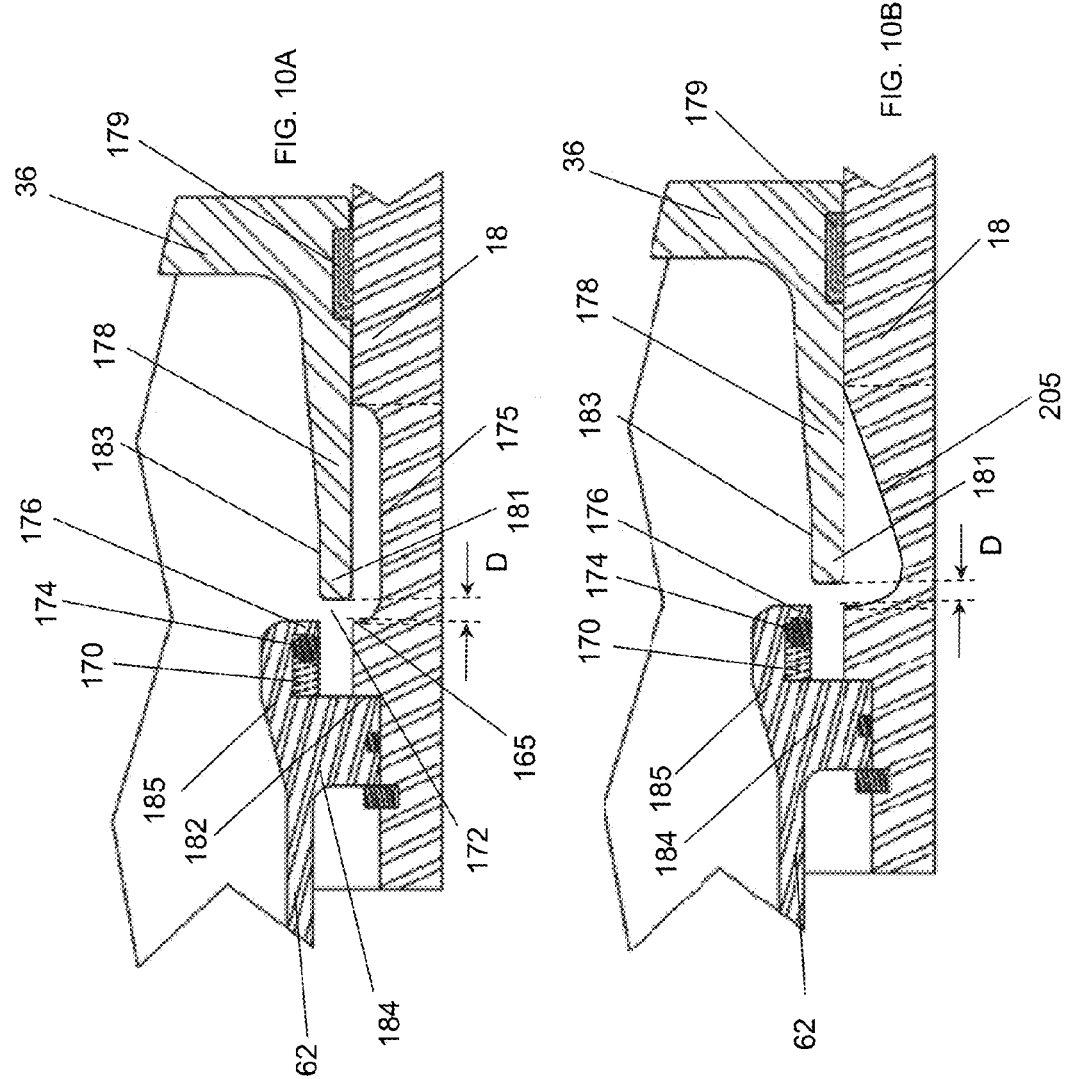

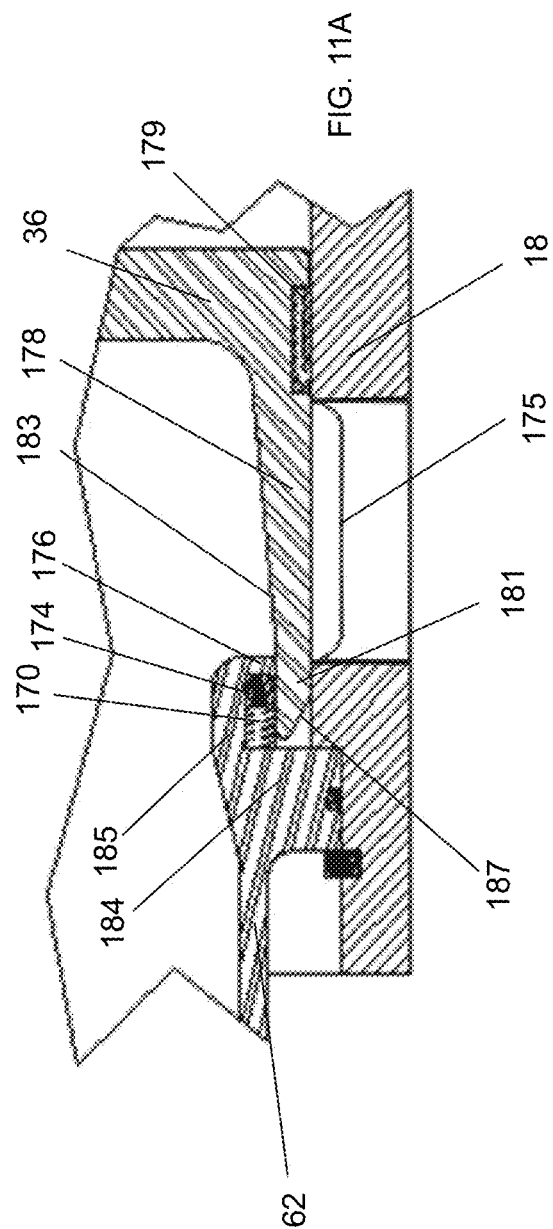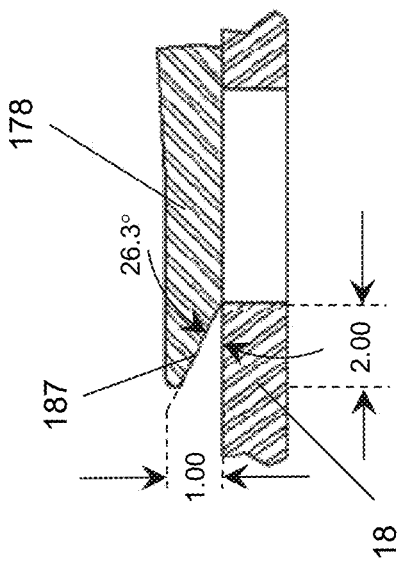

DEVICE FOR MARINE SEISMIC EXPLORATIONS FOR DEPOSITS

RELATED PATENT APPLICATIONS

This application is a continuation-in-part of U.S. patent application Ser. No. 14/187,309 filed Feb. 23, 2014 entitled DEVICE FOR MARINE SEISMIC EXPLORATIONS FOR DEPOSITS which claims the benefit of U.S. Provisional Patent Application No. 61/791,342 filed Mar. 15, 2013 and U.S. Provisional Patent Application No. 61/768,496 filed Feb. 24, 2013 both applications entitled DEVICE FOR MARINE SEISMIC EXPLORATIONS FOR DEPOSITS and which are all hereby incorporated herein by reference in the entirety.

FIELD OF THE INVENTION

The present invention relates to air guns intended for use in generating seismic energy impulses, i.e. acoustical waves, in a body of water. More particularly, this invention relates to low pressure air guns operable at pressures below 1000 psi in order to mitigate damage to the marine environment by reducing or eliminating undesirable and unusable high frequency sounds which are thought to be the source of damage to the hearing of marine mammals and fish as well as disturbing the habitats and well-being of marine life. The present invention is directed to a multi-port air gun having at least one circumferential annular groove to expel as much air as possible from the firing chamber for the shortest distance traveled by the shuttle assembly improving the overall efficiency of the air gun. The present invention is further related to the control of the rise time of the initial output pulse using speed controllers and adjustments to the profile of the firing flange thereby controlling the flow rate of compressed air as it bursts through the output ports.

The present invention is further related to a hollow in-line integrated communications connector that includes a signal transmitter to transmit the time instant when the air gun has fired to the exploration vessel, a hydrophone to monitor the wave shape character of the air gun sound pulse, a temperature sensor to monitor the water temperature of the surrounding water where the air gun is being operated, and a pressure sensor to monitor the water pressure corresponding to the air gun operating depth. The integrated communications connector is removable from the air gun to provide for replacement of faulty air guns and to provide access to failed components greatly reducing down time in deployment of the air guns during a seismic survey.

BACKGROUND OF THE INVENTION

Air guns, as used herein, are sound sources for marine seismic exploration for petroleum deposits. The operating components of air guns of the prior art include a firing chamber holding a charge of gas under high pressure, a two-piston shuttle assembly having a firing piston which retains the charge of pressurized gas within the firing chamber, and an operating piston positioned within an operating chamber where highly pressurized gas acts against the operating piston to maintain the shuttle assembly in a closed position until firing. A hollow shaft of the shuttle assembly interconnects the two pistons and provides for pressurized gas to flow from the operating chamber through the shaft to charge the firing chamber. The air gun is triggered using a solenoid operated valve to release high pressure air into the operating chamber actuating the shuttle assembly to cause an abrupt discharge of high pressure air from the firing chamber through discharge ports and directly into the surrounding water, the water in which the air gun is immersed.

Air guns of the prior art are normally run using an air compressor on board an exploration vessel that yields high pressure compressed air in the range of 2000 psi to 3000 psi. The air gun is towed astern. The return signals are received by an array of towed hydrophones. Air guns are relatively deep penetration sources, operating with output frequencies generally between 10 Hz to about 1200 Hz, to identify subsurface geologic layers and define the subsurface structure. The present invention provides many advantages considered significant and valuable by the inventor hereof. The inventor hereof has additional patents such as U.S. Pat. Nos. 3,379,273 4,038,630, 4,271,924, 4,599,712, 4,779,245, 5,432,757, and 8,223,591. There are also some other inventors in the same field such as Fiske, U.S. Pat. No. 4,757,482, Mayzes, U.S. Pat. No. 5,315,917, Jensen U.S. Pat. No. 7,269,099 and others in the field.

OBJECTS AND SUMMARY OF THE INVENTION

As noted, air guns of the prior art that are used for oil exploration typically use air pressures of from 2000 psi to 3000 psi which explodes from the air guns when they are triggered thus producing the sound pulses used for seismic analysis. The high operating pressures of these air guns produce undesirable and unusable high frequency sounds which are not helpful for the purpose of finding oil and which are thought to be the source of damage to the hearing of marine mammals and fish as well as disturbing the habitats and well-being of marine life. There is recently mounting pressure on the exploration industry to eliminate these high frequencies from the pulses of the air gun arrays used. Possible causes of these high frequencies being, 1) the high pressure which air guns are run at cause cavitation at the corners of the ports as the air bursts out of the ports; 2) high pressure air leaking from clearances between the gun housing and shuttle as the shuttle accelerates after being triggered before clearing the ports; 3) conventional air guns shoot a slug of water out of the ports as the shuttle accelerates after the gun is triggered this slug of water may be producing a water gun effect causing cavitation as water guns do when they are triggered; and 4) the high pressure air may rush out of the ports at such high velocity as to cause high frequency sounds due to cavitation around the edges of the ports during its acceleration from the ports. The high pressures as well produce a very short rise time of the initial pulse that is thought to also be a cause of unwanted high frequencies. The air gun of the present invention reduces high frequencies and cavitation by providing a circumferential annular groove that may pass through and between the discharge ports. The present invention further provides features of a sliding seal at the firing piston, the extension of width and inner diameter of the discharge ports beyond the diameter of the firing piston and the controlling of the speed of the shuttle assembly to control the rate of release of pressurized air through the outlet ports. By controlling the rate of release of the pressurized air, the rise time from zero pressure to peak pressure of the first or primary pressure pulse may be slowed, increasing the time to reach peak pressure which may in fact reduce some of the causes the objectionable high frequencies and cavitation. The present invention further provides control of the rate of release of air at the outlet ports through adjustments to the length, angle, and/or profile of the firing flange to slow or shape the rise rate of the initial output pulse of the air gun. Additionally, providing an air gun which fires at low pressure will itself be a source of reduced high frequency noise.

As described herein, the unique design features of the low pressure air gun of the present invention provides advantages in the costs to manufacture, repair and deployment of the air guns that are unlike air guns of the prior art. Costs benefits and ease in repair may be realized through an integrated communications connector that is separable from the air gun housing for improved control, easier access to components and easier replacement of air guns that have failures or defects. In embodiments of the present invention, the hollow in-line integrated communications connector may provide control of the air gun through electronics to control a solenoid operated valve that triggers the firing of the air gun. The hollow in-line integrated communications connector may further transmit the time instant when the air gun has fired to the exploration vessel and may further monitor the wave shape character of the air gun sound pulse. The temperature and pressure of the surrounding water may also be monitored through the integrated communications connector to assist in determining the effect on the marine environment and depth where the air gun is being operated.

The communications connector assembly may be horizontally oriented to connect with the solenoid valve assembly that is bolted on to the top of a valve housing cover. The connector includes electrical cables that pass into and through an internal chamber of the valve housing for the purpose of making electrical connections to internal electronic circuit boards. The electrical cables of the connector supply electric power and control lines to the solenoid valve firing circuit and supply power to the sensors on the solenoid valve housing body and on the connector itself. These sensors may be a time break transducer to signal the time instant when the air gun has fired, temperature and pressure sensors as well as one or more hydrophones to monitor the wave shape character of the air gun sound pulse. The modular length heavy duty communications and power cables of the hollow in-line integrated connector system provides for the quick replacement of the air gun or cable-connector assemblies resulting in less ship down time in the case where it is necessary to change out any of those components.

It is an object of the present invention to operate an air gun at low pressures below 1000 psi and more preferably at pressures from 400 psi-600 psi.

It is another object of the invention to provide an air gun which produces little or no harmful high frequencies.

It is another object of the invention to provide an air gun which produces increased low frequency output.

It is another object of the invention to provide an air gun which reduces cavitation around the air gun to limit the disruption of the marine ecosystem.

It is another object of the invention to provide a sound source which will produce more low frequency energy and less high frequencies.

It is another object of the invention to provide an air gun having a circumferential annular groove to expel as much air as possible from the firing chamber for the shortest distance traveled by the shuttle assembly improving the overall efficiency of the air gun.

It is another object of the present invention to assemble an air gun lighter in construction in proportion to the lower operating pressure of a low pressure air gun as compared to the operating pressure of a conventional high pressure air gun thereby producing a lighter and more easily handled air gun.

It is another object of the present invention to assemble a low pressure air gun using a snap ring to affix the firing chamber to the cylindrical housing of the low pressure air gun housing.

It is another object of the present invention to assemble a low pressure air gun using a snap ring to affix the operating chamber head to the cylindrical housing of the low pressure air gun housing.

It is another object of the present invention to reduce the use of bolts or clamp rings in assembling the air gun by using snap rings.

It is another object of the present invention to assemble a low pressure air gun having shuttle assembly flanges that are thinner and lighter than conventional high pressure air guns providing for faster acceleration of the shuttle assembly within the air gun housing.

It is another object of the present invention to assemble a low pressure air gun having a sliding firing seal that is directly adjacent to the ports to prevent the release of air from the firing chamber until the firing piston moves past the ports.

It is another object of the present invention to assemble a low pressure air gun having a sliding firing seal that seals along an inner diameter of the firing piston flange preventing the release of air from the firing chamber until the firing piston moves past the ports.

It is another object of the present invention to prevent leakage during the acceleration distance.

It is another object of the present invention to extend the width of the ports beyond the outer diameter of the firing piston providing a larger communication area of air expelled to the outside water for the least amount of travel of the shuttle assembly.

It is another object of the present invention to improve the firing precision of the air gun by providing a shortened trigger air passage, the air passage at a length shorter than the radius of the operating flange.

It is another object of the invention to provide an air cushion chamber of a length that is approximately 20% longer in length than the length of the operating chamber thereby reducing pressure buildup in the air cushion chamber that may decrease the length of the stroke of the shuttle assembly.

It is another object of the invention to provide full opening of the ports at low pressure.

It is another object of the invention that from a set position the distance from the inner face of the firing piston is longer than the distance from the face of the operating flange to the chamber head.

It is another object of the invention to assemble an air gun having a piston ring on the outside diameter of the shuttle assembly operating flange.

It is another object of the invention to control the speed of the shuttle assembly through adjustment of the geometry of grooves by adjusting the depth, width, length, and slope of grooves within a fluted sleeve within the operating chamber.

It is another object of the present invention to provide an air gun with improved shuttle assembly speed control.

It is another object of the present invention to control the rise time from zero pressure to peak pressure of the first or primary pressure pulse to increase the time to reach peak pressure to reduce or eliminate objectionable high frequencies.

It is another object of the present invention to assemble a low pressure air gun using vacuum oven brazing at mating surfaces to affix a reinforcing backbone to the cylindrical housing, the back bone having air passages for providing compressed air to the low pressure air gun.

It is another object of the present invention to assemble a low pressure air gun using vacuum oven brazing to affix a bulkhead wall within the cylindrical housing of the air gun.

It is another object of the present invention to reduce degradation and wear on seals and structural components of the low pressure air gun.

It is a still further object of the invention to provide an air gun which by virtue of being operated at low pressures is safer.

It is a still further object of the present invention to control of the rate of release of air at the outlet ports through adjustments to the length, angle, and/or profile of the firing flange to slow or shape the rise rate of the initial output pulse of the air gun.

It is a still further object of the present invention to produce an air gun solenoid valve and firing circuit hollow in-line integrated communications connector assembly which includes an air gun pulse signature hydrophone symmetrically facing the ports of the air gun for an accurate rendition of the near-field pulse of the air gun as well as including a water pressure sensor as well as a water temperature sensor.

It is a still further object of the present invention is the inclusion of the near-field hydrophone sensor with the in-line integrated communications connector assembly that is directed towards and at an equal distance from the exhaust ports.

It is another object of the present invention to produce an air gun firing circuit and solenoid valve assembly and a connector assembly which is bolted on to the top of the firing circuit and solenoid valve assembly horizontally in the direction of towing of the air gun by the exploration vessel and wherein the main firing control cable passes through the connector assembly with electric wire branch connections leading to control circuits for controlling the solenoid valve and to connect pressure, temperature, and hydrophone sensors.

It is yet another object of the present invention to produce an air gun firing circuit and solenoid valve assembly as well as a connector assembly which can be removed from the firing circuit and solenoid valve assembly wherein either assembly may be replaced independently of the other without disturbing any wiring.

The present invention is related to an air gun for seismic exploration, that comprises a cylindrical housing having a plurality of discharge ports; a bulkhead wall within the cylindrical housing to separate an operating chamber from an air cushion chamber; a shuttle assembly having a shaft inserted through a central opening in the bulkhead wall and having an operating flange on an end of the shaft within the operating chamber; a cup shaped firing piston secured to an opposing end of the shuttle assembly shaft, the firing piston separating the air cushion chamber from the firing chamber; and wherein the air cushion chamber is of a length along the shuttle axis that is at least 1.2 times the length of the operating chamber along the shuttle axis.

The air gun for seismic exploration operates at pressures below 1000 psi and more preferably within a range of 400 psi to 600 psi. The bulkhead wall of the air gun for seismic exploration may be vacuum brazed within the cylindrical housing. The central opening in the bulkhead wall of the air gun may have shaft seal rings and a retainer ring. The shuttle assembly shaft has a hollow bore through the shaft and cylindrical bearings and piston rings within the hollow bore and a shuttle assembly support spindle is inserted within the hollow bore. The air gun for seismic exploration further comprises snap rings to attach the firing chamber and an operating chamber head to the cylindrical housing. The air gun for seismic exploration further comprises a backbone vacuum brazed permanently in place on top of and to reinforce the cylindrical housing and serve as a flat mounting surface for solenoid operated air gun firing valve. The air gun for seismic exploration further comprises a trigger air passage directly through the backbone and the bulkhead wall to an annular space of the operating flange within the operating chamber. The air gun may comprise a solenoid valve housing detachable from the reinforcing backbone, the solenoid valve housing enclosing one of at least a solenoid operated air gun firing valve and a firing circuit. Alternatively, the air gun may comprise a solenoid valve housing vacuum brazed to the reinforcing backbone. The cup shaped firing piston of the air gun may have a sliding seal preventing air leaks between the cylindrical housing, firing chamber and air cushion chamber until the air gun is triggered and air is released through the plurality of discharge ports. The plurality of discharge ports of the air gun may have at least one horizontal post divider and the ports may extend beyond the outer diameter of the cup shaped firing piston, and the ports may point outwardly opposite each other and horizontally away from the center line of the air gun.

The present invention further relates to a low pressure air gun for seismic exploration which reduces undesirable and unusable high frequency sounds, that comprises a cylindrical housing; a bulkhead wall within the cylindrical housing to separate an operating chamber from an air cushion chamber; a central opening in the bulkhead wall; a shuttle assembly having a shaft inserted through the central opening in the bulkhead wall and having an operating flange on an end of the shaft within the operating chamber; a cup shaped firing piston secured to an opposing end of the shuttle assembly shaft separating the air cushion chamber from the firing chamber; a plurality of ports formed within the cylindrical housing, the width of the ports extending to a distance greater than the outer diameter of the cup shaped firing piston; a firing chamber secured to the cylindrical housing; and the air gun operates at pressures is in a range of 400 psi to 1000 psi.

The air cushion chamber of the low pressure air gun for seismic exploration which reduces undesirable high frequency sounds may be of a length along the shuttle axis that is at least 1.2 times the length within the operating chamber along the shuttle axis as measured from the face of the operating flange to an operating chamber head. The low pressure air gun for seismic exploration which reduces undesirable high frequency sounds may further comprise a speed controller which comprises a fluted sleeve installed within the operating chamber; a piston ring installed to the outer diameter of the operating flange; and when triggered the operating flange moves the piston ring over the fluted sleeve to control the speed of the shuttle assembly. The speed controller controls the speed of the shuttle assembly to control the rise time from zero pressure to peak pressure of the primary pressure pulse. The speed controller fluted sleeve has grooves and the slope of the rise time of the primary pressure pulse is adjusted by modifying the geometry of one of at least the length, width, depth, slope and shape of the grooves. The low pressure air gun may further comprise a fluid filled speed controller.

The low pressure air gun for seismic exploration which reduces undesirable high frequency sounds further comprises snap rings to attach the firing chamber and the operating chamber head to the cylindrical housing. The low pressure air gun for seismic exploration which reduces undesirable high frequency sounds further comprises a backbone vacuum brazed permanently in place on top of and to reinforce the cylindrical housing and serve as a flat mounting surface for solenoid operated air gun firing valve. The low pressure air gun further comprises a trigger air passage directly through the backbone and the bulkhead wall to an annular space of the operating flange within the operating chamber said trigger air passage length less than radius of the operating flange. The low pressure air gun may further comprise a solenoid valve housing detachable from the reinforcing backbone, the solenoid valve housing enclosing one of at least a solenoid operated air gun firing valve and a firing circuit. Alternatively, the low pressure air gun may further comprise a solenoid valve housing vacuum brazed to the reinforcing backbone. The bulkhead wall of the low pressure air gun may be brazed in place to the cylindrical housing. The low pressure air gun may further comprise shaft seal rings and a retainer ring installed within the central opening in the bulkhead wall around the shuttle assembly shaft to seal the operating chamber from the air cushion chamber. The cup shaped firing piston of the low pressure air gun may have a sliding seal preventing air leaks between the cylindrical housing, firing chamber and air cushion chamber until the air gun is triggered and air is released through the plurality of ports. The plurality of ports of the low pressure air gun may have at least one horizontal post divider and the ports may extend beyond the outer diameter of the cup shaped firing piston, said ports pointing outwardly opposite each other and horizontally away from the center line of the air gun.

The present invention is further related to a method of reducing desirable high frequency sounds from an air gun, comprising the steps of assembling an air gun having a cylindrical housing; vacuum brazing a bulkhead wall within the cylindrical housing to separate an operating chamber from an air cushion chamber; installing close fitting shaft seal rings and a retainer ring within a central opening in the bulkhead wall; inserting a shuttle assembly having a shaft through the central opening in the bulkhead wall to seal the operating chamber from the air cushion chamber, the shuttle assembly shaft having a hollow bore through the shaft and having an operating flange on an end of the shaft within the operating chamber; inserting a fluted sleeve within the operating chamber; installing a piston ring to the outer diameter of the operating flange; installing cylindrical bearings and shaft seal rings within the hollow bore of the shuttle assembly shaft; inserting a shuttle assembly support spindle within the hollow bore; affixing an operating chamber head to the cylindrical housing using snap rings; affixing a cup shaped firing piston to an opposing end of the shuttle assembly shaft within the air cushion chamber; forming a plurality of ports within the cylindrical housing, the width of the ports extending to a distance greater than the outer diameter of the cup shaped firing piston; affixing a firing chamber to the cylindrical housing using snap rings; supplying an air trigger pulse to the operating flange to move the piston ring over the fluted sleeve to control the speed of the operating flange and thereby the rise time from zero pressure to peak pressure of the primary pressure pulse as air is expelling from the ports as the bottom end of the cup shaped firing piston crosses an edge of the plurality of ports. The method of reducing desirable high frequency sounds from an air gun may further comprise the steps of vacuum brazing a reinforcing backbone to the cylindrical housing; and vacuum brazing a solenoid valve housing to the reinforcing backbone, the solenoid valve housing enclosing a solenoid operated air gun firing valve and firing circuit. The method of reducing desirable high frequency sounds from an air gun may further comprise the step of sealing the bottom end of the cup shaped firing piston to the firing chamber using a spring loaded backup ring and sliding firing seal. The method of reducing desirable high frequency sounds from an air gun may further comprise the step of operating the air gun at pressures below 1000 psi and more preferably within a range of 400 psi to 600 psi.

The present invention is further related to an air gun for seismic exploration, comprising a housing having an operating chamber and an air cushion chamber; a shuttle assembly having a shaft, the shaft having an operating flange on one end within the operating chamber and having a firing piston on an opposing end within the air cushion chamber; a plurality of discharge ports formed within the housing; at least one circumferential annular groove along the inside diameter of the housing; and wherein firing the air gun releases a sound pulse through the plurality of discharge ports. The air gun for seismic exploration may operate at pressures in a range of 400 psi to 1000 psi. The air gun for seismic exploration may have the air cushion chamber in a set position that is of a length along the shuttle axis that is at least 1.2 times the length within the operating chamber along the shuttle axis as measured from a face of the operating flange to an operating chamber head. The air gun for seismic exploration may have the at least one circumferential annular groove connecting the plurality of discharge ports. The air gun for seismic exploration may further comprise a speed controller, the speed controller comprising a fluted sleeve installed within the operating chamber; a piston ring installed to the outer diameter of the operating flange; and when triggered the operating flange moves the piston ring over the fluted sleeve to control the speed of the shuttle assembly. The speed controller controls the speed of the shuttle assembly to control the rise time from zero pressure to peak pressure of the primary pressure pulse. The speed controller fluted sleeve may have grooves and the slope of the rise time of the primary pressure pulse is adjusted by modifying the geometry of one of at least the length, width, depth, slope and shape of the grooves. The air gun for seismic exploration may further comprise a fluid filled speed controller. The air gun for seismic exploration may further comprise snap rings to attach the firing chamber and the operating chamber to the housing. The air gun for seismic exploration may further comprise a backbone vacuum brazed on top of the housing, the backbone having a flat mounting surface for a solenoid operated air gun firing valve. The air gun for seismic exploration may further comprise a trigger air passage directly through the backbone to the operating chamber. The air gun for seismic exploration may further comprise a solenoid valve housing detachable from the reinforcing backbone, the solenoid valve housing enclosing one of at least a solenoid operated air gun firing valve and a firing circuit. The air gun for seismic exploration may further comprise a solenoid valve housing vacuum brazed to the reinforcing backbone. The air gun for seismic exploration may further comprise an integrated connector detachable from a solenoid valve housing, the solenoid valve housing detachable from the reinforcing backbone, the solenoid valve housing enclosing one of at least a solenoid operated air gun firing valve and a firing circuit. The air gun for seismic exploration may further comprise an integrated connector detachable from the air gun. The air gun for seismic exploration may further comprise a bulkhead wall separating the operating chamber and the air cushion chamber, the bulkhead wall may be brazed in place to the housing. The air gun for seismic exploration may further comprise shaft seal rings and a retainer ring to seal the operating chamber from the air cushion chamber. The firing piston of the air gun for seismic exploration may have a sliding seal preventing air leaks between the housing, firing chamber and air cushion chamber until the air gun is triggered and air is released through the plurality of discharge ports. The firing piston may have a cup shaped flange and the firing chamber may have a sliding seal on the inside diameter of the cup shaped flange preventing air leaks between the housing, firing chamber and air cushion chamber until the air gun is triggered and air is released through the plurality of discharge ports. The inside diameter of the cup shaped flange may un-seal from the sliding seal of the firing chamber in a direction opposite to the direction in which the compressed air within the firing chamber is acting upon the sliding seal. The cup shaped flange of the firing piston may have a tapered edge and the character of the rise time of the pressure pulse is adjusted by modifying the geometry of one of at least the length, width, slope and shape of the tapered edge. The tapered edge of the cup shaped flange of the firing piston may be tapered back in the direction of the firing motion of the shuttle assembly. The tapered edge may be formed as a straight taper. The tapered edge may be formed as a curved taper. The shuttle assembly shaft of the air gun for seismic exploration may have a hollow bore through the shaft and cylindrical bearings and piston rings within the hollow bore of the shuttle assembly shaft. The air gun for seismic exploration may further comprise a shuttle assembly support spindle inserted within the hollow bore. The plurality of discharge ports of the air gun for seismic exploration may have at least one horizontal post divider and the ports extending beyond the outer diameter of the cup shaped firing piston, said ports pointing outwardly opposite each other and horizontally away from the center line of the air gun. The circumferential annular groove of the air gun for seismic exploration may vary in depth and/or may vary in shape.

The present invention is further related to a method of producing low frequency sounds from an air gun, comprising the steps of operating an air gun below 1000 psi, the air gun having a shuttle assembly and discharge ports; firing into at least one circumferential groove connecting the discharge ports; and expelling as much air as possible from the firing chamber for the shortest distance of travel of the shuttle assembly.

The present invention is further related to a method of producing sound pulses from an air gun, comprising the steps of installing a bulkhead wall within a housing to separate an operating chamber from an air cushion chamber; inserting a shuttle assembly having a shaft through an opening in the bulkhead wall, the shuttle assembly shaft having an operating flange on an end of the shaft within the operating chamber and having a firing piston on an opposing end within the air cushion chamber; forming a plurality of ports within the housing; forming at least one circumferential annular groove along the inside diameter of the housing; and firing the air gun to release a sound pulse through the plurality of discharge ports. The method of producing sound pulses from an air gun may further comprise the steps of sealing the inside diameter of the firing piston to the firing chamber using a spring loaded backup ring and sliding firing seal. The method of producing sound pulses from an air gun may further comprise the step of operating the air gun at pressures below 1000 psi and more preferably within a range of 400 psi to 600 psi. The method of producing sound pulses from an air gun may further comprise the step of assembling the air cushion chamber in a set position to a length along the shuttle axis that is at least 1.2 times the length within the operating chamber along the shuttle axis as measured from the face of the operating flange to an operating chamber head. The method of producing sound pulses from an air gun may further comprise the step of varying the depth of the circumferential annular groove. The method of producing sound pulses from an air gun may further comprise the step of varying the shape of the circumferential annular groove. The method of producing sound pulses from an air gun may further comprise the step of connecting the circumferential annular groove through and between the plurality of discharge ports.

These and other features, advantages and improvements according to this invention will be better understood by reference to the following detailed description and accompanying drawings. While references may be made to upper, lower, vertical and horizontal, these terms are used merely to describe the relationship of components and not to limit the operation of the present invention to any one orientation.

BRIEF DESCRIPTION OF THE DRAWINGS

The invention, together with further objects, features, aspects and advantages thereof will be more fully understood and appreciated by consideration of the following description in conjunction with the accompanying drawings in which the respective elements bear the same reference numerals throughout the various views.

FIG. 2 is an end view of an embodiment of the air gun of the present invention showing an electrical cable block connector that may be optionally on the top or side of the solenoid valve housing of the present invention;

FIG. 3 is a top view of an embodiment of the air gun of the present invention;

FIG. 4B is a longitudinal cross sectional view of an embodiment of the operating chamber of the air gun of the present invention;

FIG. 5A is a longitudinal cross sectional view of an embodiment of the liner sleeve of the operating chamber of the air gun of the present invention;

FIG. 5B is a longitudinal cross sectional view of an embodiment of the liner sleeve of the operating chamber of the air gun of the present invention;

FIG. 5C is a cross sectional view along section A-A of FIG. 5A of an embodiment of the liner sleeve of the operating chamber of the air gun of the present invention;

FIG. 7C is a longitudinal cross sectional view of an embodiment of a fluid filled speed controller in the firing position in the further embodiment of the air gun of the present invention;

FIG. 8A is a longitudinal cross sectional view of an embodiment of the firing chamber and discharge ports of the air gun of the present invention;

FIG. 8B is a cut out cross sectional view of an embodiment of the sliding firing seal and assembly of the air gun of the present invention;

FIG. 8C is a cross sectional view along section A-A of FIG. 8A of an embodiment of the firing chamber, circumferential annular groove, and discharge ports of the air gun of the present invention.

FIG. 9A is a longitudinal cross sectional view of a further embodiment of the firing chamber and cup shaped flange of the firing piston of the air gun of the present invention;

FIG. 9B is an inset of the longitudinal cross sectional view of the further embodiment of the firing chamber and cup shaped flange of the firing piston of the air gun of the present invention;

FIG. 10A is an inset of the longitudinal cross sectional view of the further embodiment of the firing chamber and an embodiment of the cup shaped flange of the firing piston of the air gun of the present invention;

FIG. 10B is an inset of the longitudinal cross sectional view of the further embodiment of the circumferential annular groove of the firing chamber and an embodiment of the cup shaped flange of the firing piston of the air gun of the present invention;

FIG. 11A is an inset of the longitudinal cross sectional view of the further embodiment of the firing chamber and a further embodiment of the cup shaped flange of the firing piston of the air gun of the present invention;

FIG. 11B is an inset of the longitudinal cross sectional view of the further embodiment of the firing chamber and the further embodiment of the cup shaped flange of the firing piston of the air gun of the present invention;

DETAILED DESCRIPTION OF THE DRAWINGS

Figure 1:
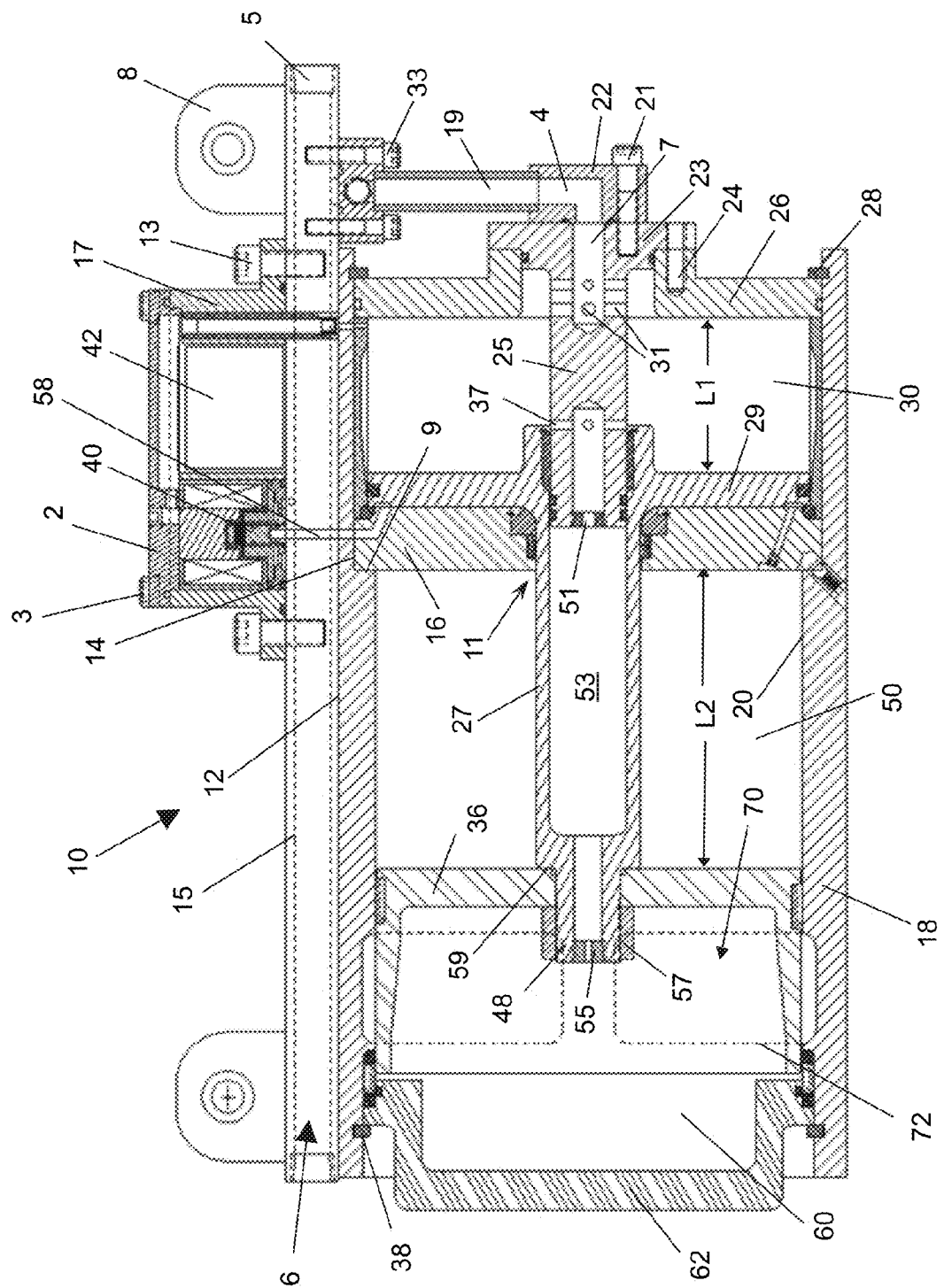
FIG. 1 is a longitudinal cross sectional view of an embodiment of the air gun of the present invention.

In an embodiment of the present invention, an air gun 10, as shown in FIG. 1, comprises a dual purpose reinforcing backbone air passage manifold 15 to strengthen the housing 18 to supply and distribute compressed air through one or more passages 6 by connecting a supply line to a connector 5 on either end of the backbone 15. The backbone 15 may have one or more tow ears 8 that may be brazed into the backbone 15 for towing the air gun 10. The backbone 15 is secured to the air gun housing 18 by vacuum oven brazing at mating surfaces 12 between the bottom of the backbone and the air gun cylindrical housing providing a flattened top for mounting a solenoid operated air gun firing valve eliminating the necessity of using bolts to attach the backbone manifold 15 to the housing 18, thus making the air gun more reliable and lighter. Bulkhead wall 16 is also brazed into air gun housing 18 at joint 14 instead of the housing being machined out of a single billet of stainless steel thus saving material costs, machine time, and labor. The bulkhead wall 16 may be seated against a shoulder 9 formed in the housing 18 where the diameter of the housing 18 is enlarged to secure the bulkhead wall 16 and form the tubular structure of the operating chamber 30. Because the air gun 10 is run at low pressures the housing 18 may have a dimensioned wall thickness that is thinner than high pressure air guns of the prior art, reducing the overall weight and costs of the air gun 10. The shuttle assembly includes a shuttle assembly shaft 27 and an operating flange 29. The shuttle assembly shaft 27 is inserted through the opening to the operating chamber 30 and through a center hole 11 in the bulkhead wall 16 with the sealing face of the operating flange 29 aligning against the bulkhead wall 16. Instead of using bolts or clamping rings, the operating chamber 30 is enclosed by securing in place the operating chamber head 26 using a retaining ring 28. The shuttle assembly support spindle 25 is inserted into the hollow shuttle assembly shaft with and the shuttle assembly support spindle flange 23 is secured to the operating chamber head 26 using bolt circle 24. An air channel block 22 is secured to the shuttle assembly support spindle flange 23 using bolt circle 21. The air channel block 22 has a 90° passage 4 to direct air flow through the air input fitting 19 and through the spindle air passage 7 to inlet openings 31 to provide air to the operating chamber 30. The compressed air input fitting 19 is secured to the backbone 15 using air input line retainer bolts 33 to communicate with compressed air passage 6.

The shuttle assembly shaft 27 extends through the bulkhead wall 16 to the air cushion chamber 50. The shaft 27 may be hollow to reduce the overall weight of the air gun 10 and act as an air supply passage for the air volume 60 within the firing chamber 62. An air inlet orifice 51 controls the flow rate of air entering the shaft interior bore 53 and an outlet orifice 55 controls the rate of flow of air entering the volume 60 of the firing chamber 62. Air is supplied from the operating chamber 30 through inlet holes 37 in the shuttle assembly support spindle 25. The shaft end 48 of the shuttle assembly shaft 27 is threaded and the cup shaped firing piston 36 is attached to the shaft end 48 using a nut 57 to lock the cup flange 36 against a shoulder 59 formed at the base of the shaft 27. Rider bearings 179 installed along the outer diameter of the cup shaped firing piston 36 to provide for the piston to freely slide along the inner walls 20 of the low pressure air gun cylindrical housing 18. In high pressure air guns of the prior art, the space behind the firing piston is filled with water that is displaced as the gun fires which may be a cause of cavitation that could disrupt the marine ecosystem. By trapping ambient air behind the firing piston, the displacement of water is reduced limiting a source of cavitation around the water gun. A series of ports 70 are formed through the housing 18 at the firing chamber 62 as indicated by dotted lines 72 showing the openings. The firing chamber 62 may be of any required dimension and may be replaced to adjust the size to create a larger or smaller volume based on survey requirements. The firing chamber 62 is secured to the air gun housing 18 using retainer ring 38. By using snap type retainer rings instead of bolts, the cylindrical walls of the housing 18 may be thinner where there is no necessity to thicken the wall to install bolts or clamping rings.

A solenoid valve housing 17 may be bolted using bolts 13 or be brazed to the backbone 15. The solenoid valve housing 17 may enclose only a solenoid valve 40 or a solenoid valve and control circuit 42 based on the specification requirements of the air gun system. An electrical cable block connector 80 extends either from the top or side of the solenoid valve housing 17, as shown in FIG. 2. A multi-pin cable connector (not shown) provides for the cable block connector 80 to be electrically connected to the solenoid valve 40 or control circuit 42 components. The block connector 80 may then be bolted to the solenoid valve housing 17 using bolts 82. The cable block connector 80 may be detached to replace the entire solenoid valve housing 17 with the solenoid valve 40 and control circuit 42 as a unit. Alternatively, an access cover 2 attached to the solenoid valve housing 17 using bolts 3 may be provided to provide access to repair or replace the solenoid valve housing 17 internal components. In this manner a defective control circuit or solenoid valve can be repaired or replaced without removal of the solenoid valve housing from the backbone 15. The cable block connector 80 further provides for a faulty air gun 10 to be replaced by only disconnecting the electrical cable block connector 80 from the solenoid valve housing and the air supply line from the backbone 15 and attaching the cable block connector 80 and air supply line to a new air gun 10, greatly reducing down time for failures during deployment of an array of air guns. As shown the trigger air passage 58 extends between the air passages 6 directly through the backbone 15 to provide for more precise firing of the air gun 10 where the air trigger passage is of a substantially shortened length as compared to air guns of the prior art.

A top view of the air gun 10 is shown in FIG. 3 with the electric cable block connector 80 directed off to the side of the solenoid valve housing 17 and electrical cables 84 extending from the block connector 80 to the exploration vessel or other similar air guns. Air supply lines 86 extend from each end of the backbone 15. A second air passage 6 may be provided for additional air supply lines if a number of air guns 10 are used in a single array. The trigger air passage 58 directs air flow to a grooved annular space 67 around the inner face of the operating flange 29 as shown in FIG. 4A.

The present invention does not require holes to be drilled through the bulkhead wall 16 to allow water to flow to lubricate the shaft seals because the shuttle assembly shaft 27 is sealed using two close fitting self-lubricating shaft seal rings 32, as shown in FIG. 4B, that seal the operating chamber 30 from the air cushion chamber 50 and allow the shuttle shaft 27 to move freely through the center hole 11 of the bulkhead wall 16 without leakage. A retainer ring 35 holds the shaft seal rings 32 in place with the retainer ring 35 being held in place using a snap ring 41. A sliding sleeve bearing 34 is installed within a recess 45 where the shuttle assembly shaft 27 is installed along the shuttle assembly support spindle 25 with two piston rings 47 sealing the shaft 27 from the operating chamber 30. A piston ring 43 surrounds the operating flange 29 to travel along a liner sleeve 52 which retains the operating seal 54.

Figure 4A:
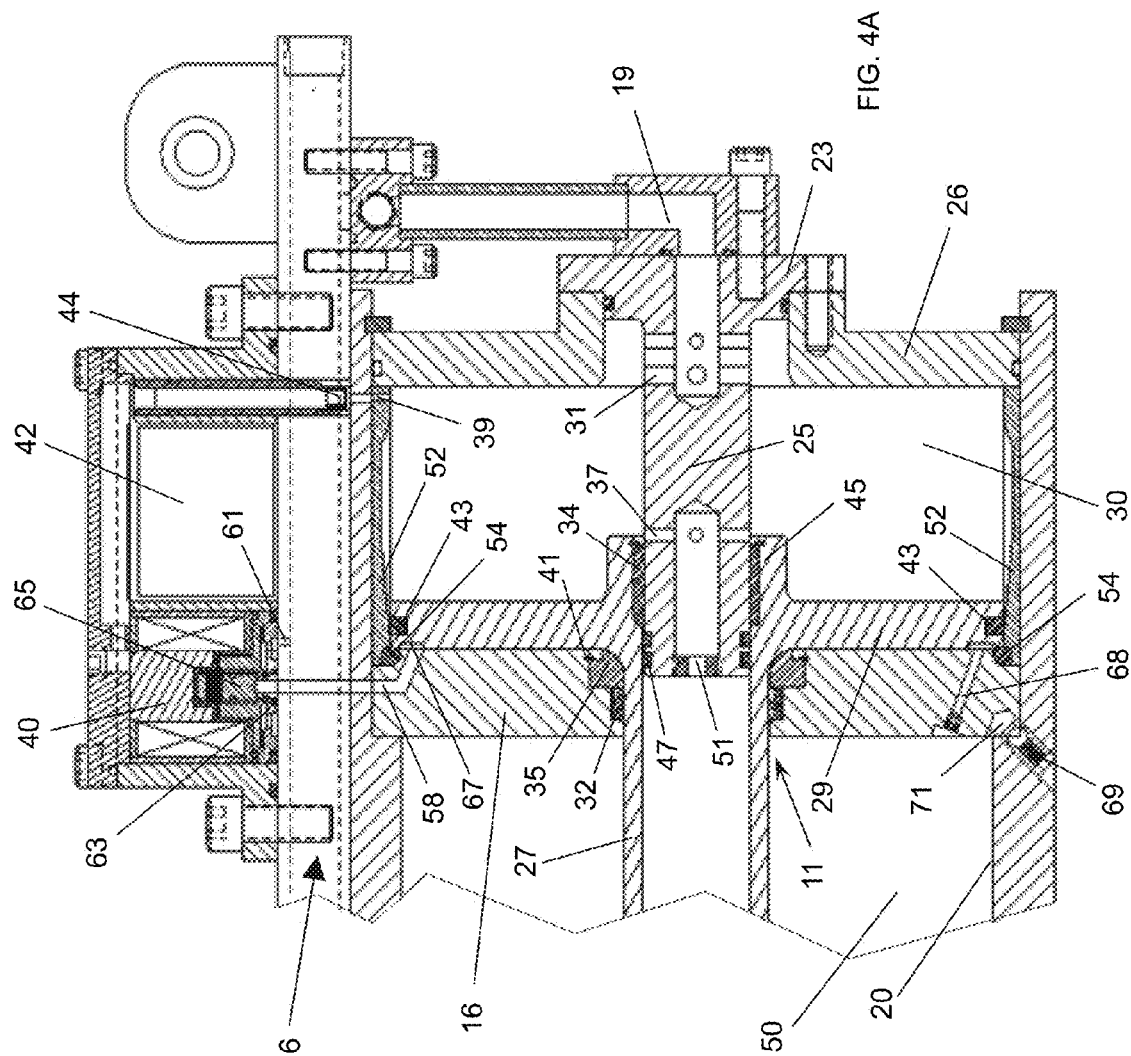
FIG. 4A is a longitudinal cross sectional view of an embodiment of the solenoid valve housing and operating chamber of the air gun of the present invention.

A trigger valve air supply hole 61 is drilled through the top wall of air passage 6 into the trigger valve air input chamber 63, enabling solenoid operated trigger valve 65 to be supplied with air as shown in FIG. 4A. When the trigger valve 65 is actuated by an electric pulse from the firing circuit 42, a shot of air flows rapidly through trigger air passage 58 into annular space 67 to trigger the air gun by breaking the seal between the outside diameter of operating flange 29 and operating seal 54 allowing the shuttle assembly to start its firing movement as pushed by the air pressure within the firing chamber 62 across the cross sectional area of the cup shaped firing piston 36. Air vent passage 68 is drilled through bulkhead wall 16 near the bottom of operating chamber 30 and air cushion chamber 50, thus allowing the air pressure in the annular space 67 to be at ambient water pressure when the operating flange 29 has returned to the set position. Check valve 69 positioned for outward flow, vents water or air from ambient air cushion chamber 50 through drilled port 71. If any water seeps into the ambient air cushion chamber 50 between air gun shots, the water is purged out through port 71 and check valve 69 by the temporary air pressure build up in ambient air cushion chamber 50 during the time the cup shaped firing piston 36 is moving from the set position as shown in FIGS. 1, 4A and 4B, to the right and back again, compressing the air from approximate ambient water pressure and allowing some of the air to flow from operating chamber 30 through drilled passage 68 into air cushion chamber 50 thus pressurizing the chamber 50 and pushing any water which may have collected in the bottom of the air cushion chamber 50 out through check valve 69 and between the clearance of the cup shaped firing piston rider bearing 179 and the cylindrical wall 20 of the housing 18. Recessed within the bulkhead wall 16, close fitting shaft seal rings 32 and retainer ring 35 prevent air from the operating chamber 30 from leaking through the center hole 11 of the bulkhead wall 16 and the outside diameter of shuttle assembly shaft 27 when the operating flange 29 is not in the set or cocked position.

When the air gun 10 is triggered, the liner sleeve 52 within the operating chamber 30, as shown in FIG. 5A, controls the air flow around the operating flange 29 to control the speed of the operating flange 29 as described in patent, U.S. Pat. No. 4,779,245 to the same inventor. However, different from the described conical tapered surface of revolution that would extend completely along the inner surface 73 of the liner sleeve 52, the present invention includes a series of non-contiguous flutes or grooves 75 shown in FIGS. 5B and 5C as cross sections of the operating chamber 30 along section A-A shown in FIG. 5A. The grooves 75 are machined into the sleeve 52 and are formed as a shallow narrow groove at a first end 77, that expands to a deeper rounded channel along a middle area 79 and tapers to a less deep rounded channel 81 closer to the inner wall 83 of the operating chamber head 26.

When the operating flange 129 is in the set to fire position shown in FIG. 5A, there is none or very little air leakage around the piston ring 43. When the trigger valve 65 is actuated by an electric pulse from the firing circuit 42, the operating flange 129 accelerates and the compressed air created by the movement of the flange 129 creates a pressure spike which enters the time break transducer passage 39, as shown in FIG. 4A, causing a time break transducer 44 installed at the passage to produce a signal to the control circuit 42 that the air gun 10 has fired. As shown in FIG. 5B, arrows indicate air flow as the piston ring 43 of the flange 129 rides along the lands 73 of the inner surface of the liner sleeve 52 between the grooves 75. The lands 73 guide the piston ring 43 within the operating flange 129. By restricting air flow initially through the formation of the shallow narrow shape of the groove 75 at the first end 77, the rise time of the first primary pressure pulse may be slowed until the operating flange 129 reaches the widened channel in the middle 79 of the groove 75. The operating flange 129 then progressively accelerates until passing the widened and deepened middle section when flange 129 nears the end 81 where the slope and width of the grooves start to close off the air flow, the flange 129 is slowed by compressing the air within the operating chamber 130 to slow and stop the flange 129 prior to hitting the inner wall 83 of the operating chamber head 126. This is the point where the pressure peaks triggering the time break transducer 44 which puts out the signal that the gun has fired. The speed of the shuttle assembly may therefore be controlled by the geometry of the grooves where the shape, width, length, slope and depth of the groove will all contribute to control of the rise time of the primary pressure pulse. By slowing the rise time, the time for the primary pressure pulse to reach peak pressure is increased which may reduce some high frequencies that are detrimental to marine life. Therefore, the appropriate groove geometry at the lower operating pressures of the air gun 10 may remove a source of undesirable frequencies that may cause damage to the hearing of marine mammals and fish.

Figure 6:
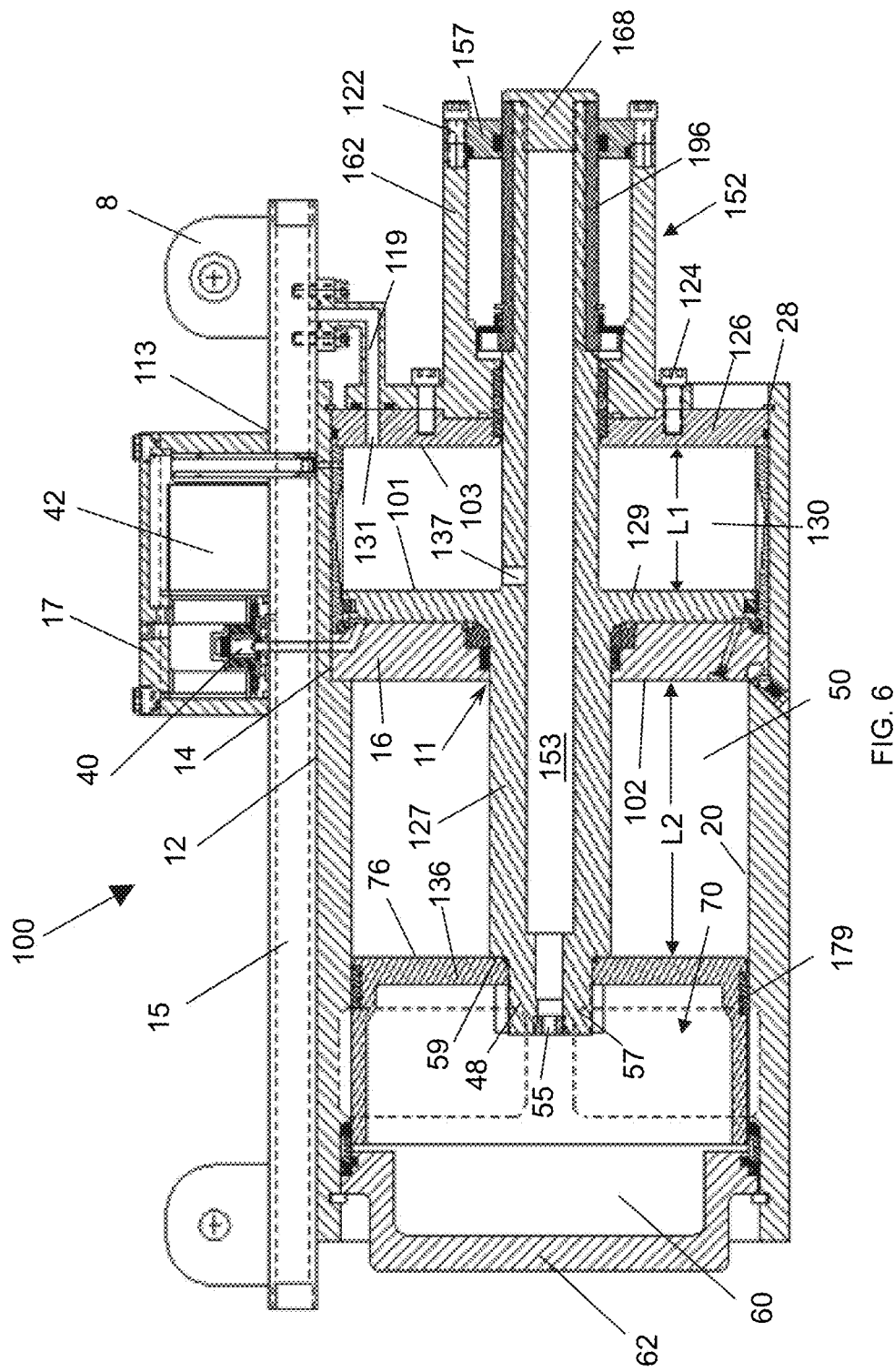
FIG. 6 is a longitudinal cross sectional view of a further embodiment of the air gun of the present invention.

In a further embodiment of the low pressure air gun 100, as shown in FIG. 6, the solenoid valve housing 17 may be affixed to the backbone 15 by vacuum oven brazing at mating surfaces 113 between the bottom of the housing 17 and backbone 15 thereby eliminating the necessity of using bolts to attach the solenoid valve housing 17. The operating chamber 130 is supplied with compressed air directly from the air supply line 119 through inlet 131 and the hollow interior bore 153 of the shaft 127 is supplied with air through inlet holes 137. The shuttle assembly shaft 127 extends through an opening in the operating chamber head 126. The air cushion chamber 50 may be of a length L2 that is at least 1.2 times longer in length along the axis of the shuttle assembly as measured in a set position from the inner face 76 of the firing piston 136 to the inner surface 102 of the bulkhead wall 16 than the length L1 within the operating chamber 130 along the axis of the shuttle assembly as measured in a set position from the inner face 101 of the operating flange 129 to the inner surface 103 of the operating chamber head 126. By increasing the length of the distance from the inner face 76 of the cup shaped firing piston 36 to the bulkhead wall 16, there is less buildup of air pressure within the air cushion chamber 50 when firing the air gun and therefore the speed and travel distance of the cup shaped firing piston 36 is less impeded. This provides for the discharge ports 70 to be opened more fully where the shuttle assembly is mostly slowed and stopped by the air cushion build up within the operating chamber 130. By opening the ports 70 more fully, the energy output from operating the air gun 10 at lower pressures may be comparable to high pressure air guns of the prior art. A fluid filled speed controller 152 is affixed to the operating chamber head 126 using bolts 124.

Figure 7A:
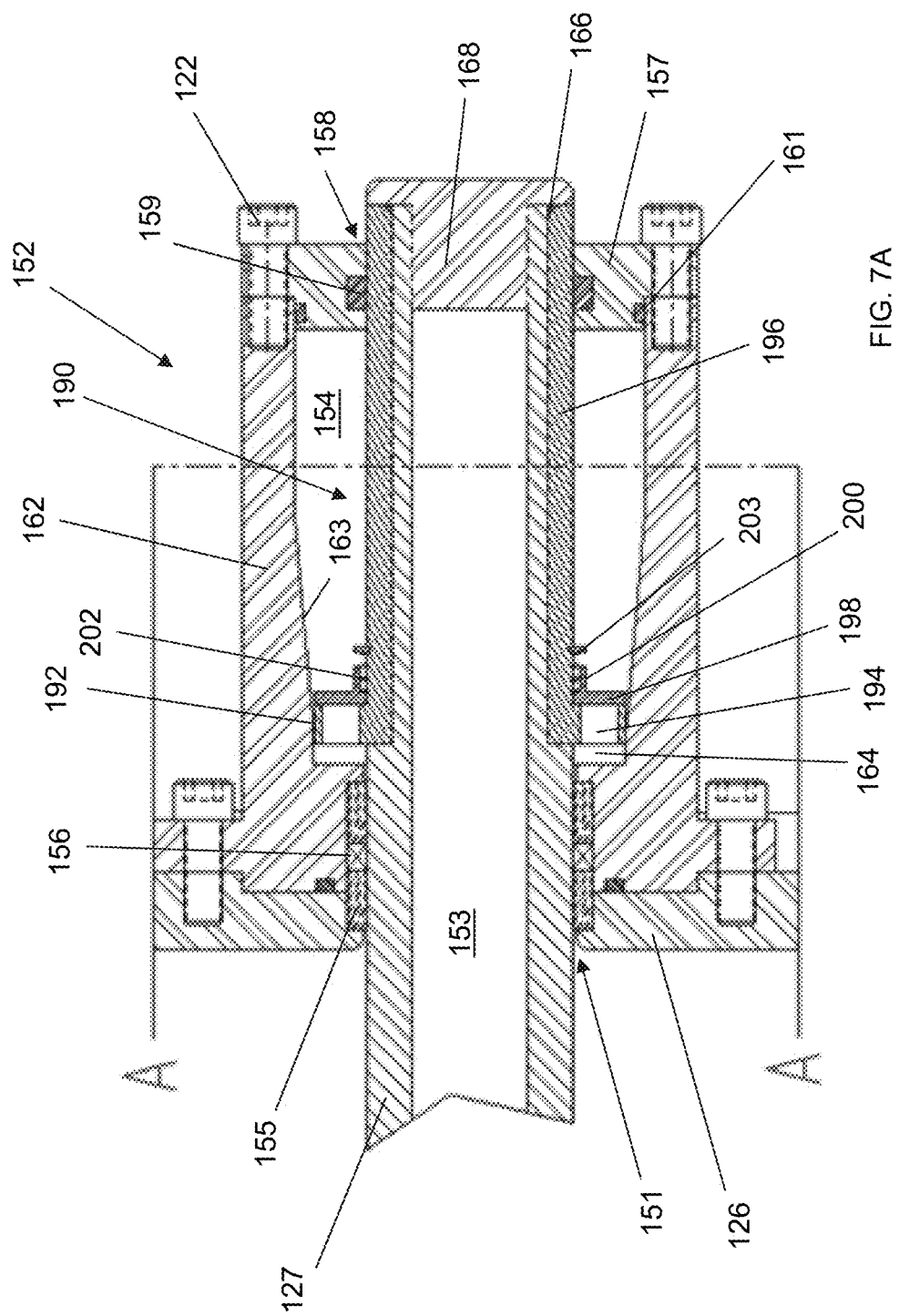
FIG. 7A is a longitudinal cross sectional view of an embodiment of a fluid filled speed controller in the further embodiment of the air gun of the present invention.
Figure 7B:
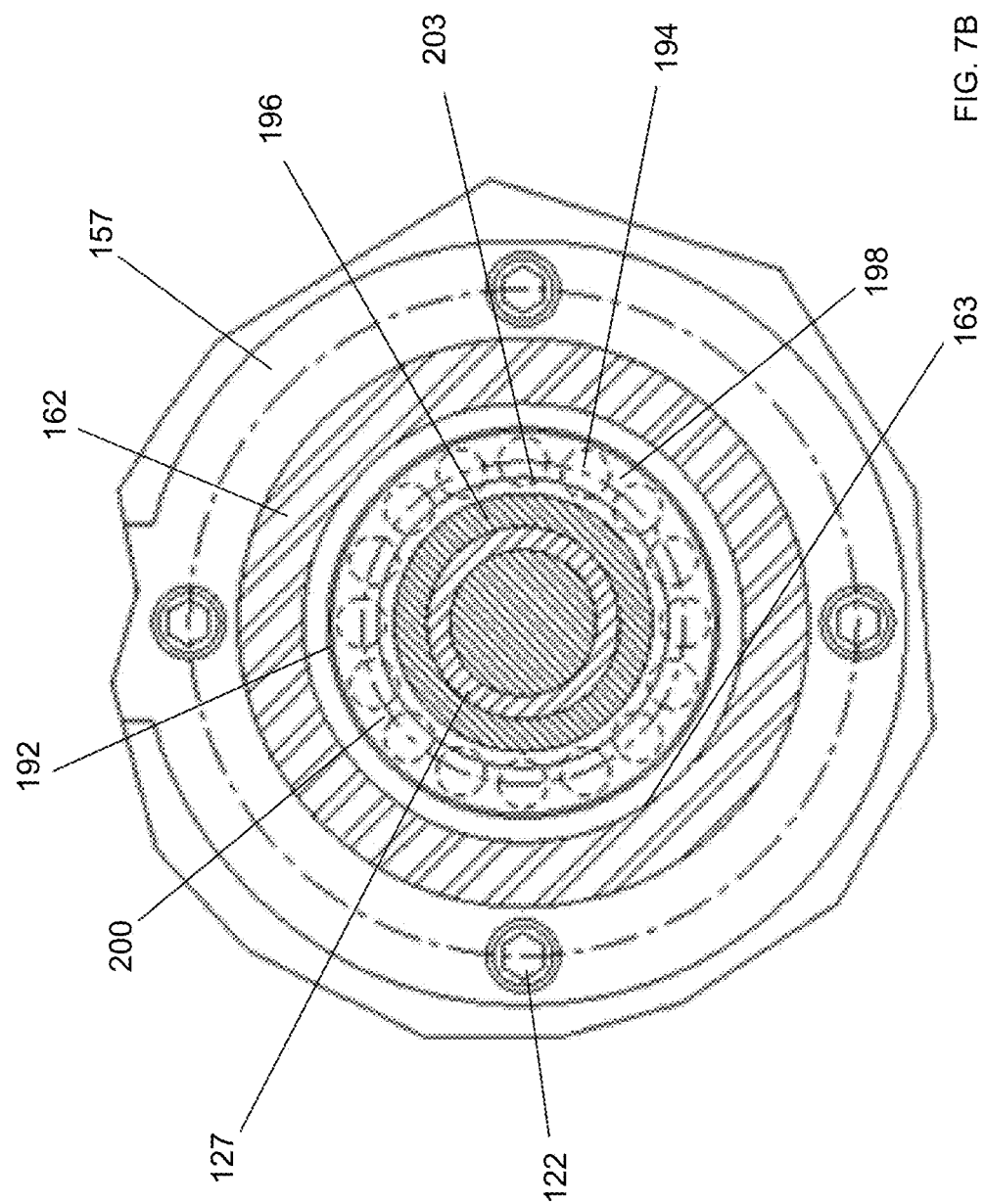
FIG. 7B is a cross sectional view along section A-A of FIG. 7A of an embodiment of a fluid filled speed controller in the further embodiment of the air gun of the present invention.

In this further embodiment which may be in addition to the operating chamber speed controller 52, a hydraulic speed controller 152 may be installed to an extended portion of the shuttle assembly shaft 127 of the air gun 100. The hydraulic speed controller 152 is bolted using bolts 124 to the outside center of the firing chamber head 126 of the air gun 100 to control the speed the shuttle assembly travels after the air gun 100 is triggered. The hydraulic speed controller 152 as shown in FIG. 7A includes an oil filled chamber 154 with the shaft assembly 127 of uniform diameter entering the opening 151 of the chamber 154 through two plastic bearings 155 with a shaft seal 156 retained between the two bearings 155. A check valve piston assembly 190 is installed to the shaft 127 and a speed controller housing head 157 is bolted to the top of the oil filled chamber 154 using bolts 122 with an opening 158 for the end of the shaft 127 to extend through the head 157. An internal shaft seal 159 seals the outside diameter of the shaft 127 within the speed controller head 157 and an O-ring seal 161 seals the head 157 to the housing 162. A threaded retainer cap 168 with an O-ring seal 166 is inserted into the hollow bore 153 to seal the shaft 127 and retain the check valve piston assembly 190 that surrounds the shuttle assembly shaft 127. The check valve piston assembly 190 includes a piston 192 with a ring of holes 194. The piston 192 is held in place within a bore 164 of the housing 162 by a tubular retainer 196 running through the speed controller housing head 157 and shaft seal 159. There is check valve plate 198 shaped like a circular washer biased against the check valve piston 192 by a spring 202 to cover the piston holes 194 causing the piston 192 with holes 194 and the spring biased ring plate 198 to become a check valve to remain closed when the shuttle assembly shaft 127 is accelerating upon triggering of the air gun 100. A spring retainer 200 retains the spring 202 and a ring plate 203 stops the spring biased ring plate 198 and sets the distance that the spring biased ring plate 198 moves when the check valve is opened. A cross sectional view of the speed controller 152 along section A-A of FIG. 7A is shown in FIG. 7B.

Figure 7D:
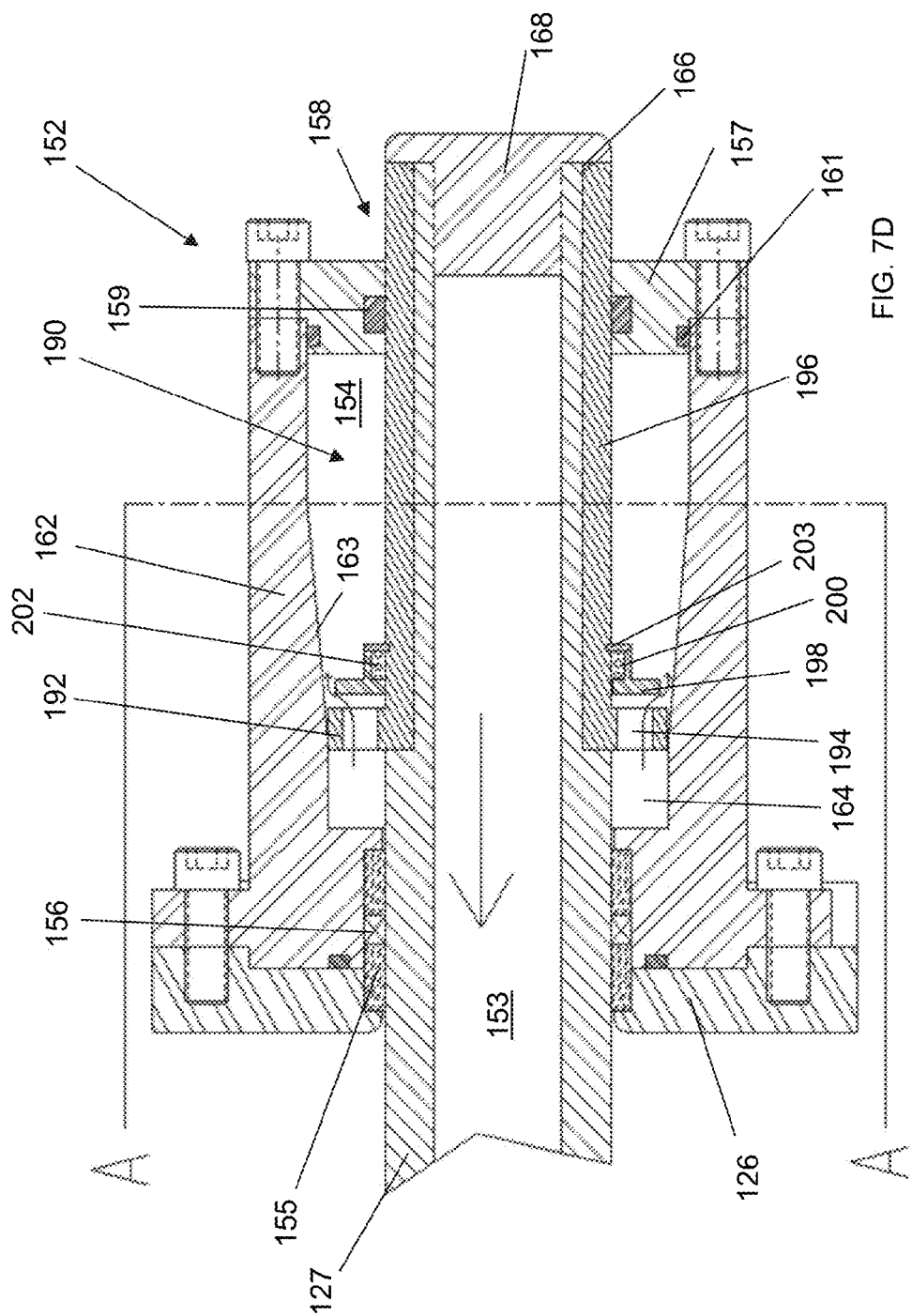
FIG. 7D is a longitudinal cross sectional view of an embodiment of a fluid filled speed controller in the set position in the further embodiment of the air gun of the present invention.

When the air gun shuttle assembly shaft 127 is in the set position before triggering the check valve piston assembly 190 is at the bottom of the speed controller housing 162 as shown in FIG. 7A where the clearance between the piston 192 and housing 162 is small. After triggering the shuttle assembly shaft 127 moves a short distance building pressure up in the housing 162 which acts against the top of the piston 192 and check valve plate 198 closing the holes 194 to retard and control the speed of the shuttle assembly as shown in FIG. 7C. The piston 192 starts to move with the shaft 127 over the outwardly tapered slope 163 of the housing bore 164 and as the shuttle assembly moves a greater distance the diameter around the piston 192 increases which allows the shuttle assembly to move faster until a terminal velocity is reached by the designed clearance between the piston 192 and housing 162. Thus the speed of the shuttle assembly can be controlled by the length of the bore and contour of the slope of the speed controller housing 162. After the shuttle assembly halts its movement after firing it reverses itself to return to the set position and during the return stroke the check valve plate 192 of the hydraulic piston assembly 190 opens to allow free hydraulic fluid such as oil to flow so that the shuttle assembly can return freely to its set position, as shown in FIG. 7D. By controlling the speed of the shuttle assembly shaft 127 through the geometry of the hydraulic speed controller bore 164 and slope 163 of the housing 162 the rate of rise of the outgoing sound pulse of the air gun may be adjusted to control the frequency content of the outgoing pulse in order to eliminate undesired high frequencies from the pulse.

As shown in FIG. 8A, due to the very rapid acceleration of the shuttle assembly of high pressure air guns, a very sharp sound output spike occurs when the end surface 172 of the opening cup shaped firing piston 36 clears the opening edge 165 of the exhaust ports 70. The rapid rise time of the resulting sound spike is so sharp, it may produce an abundance of high frequency sound in the surrounding water which is thought to be damaging to marine life such as fish and marine mammals. In order to reduce these undesirable high frequencies in a low pressure air gun, a sliding firing seal 167 is installed on the outer diameter of the cup shaped shuttle assembly flange 36 to prevent the leakage of air prior to the end surface 172 of the cup 36 clearing the edge 165 of the port. The sliding firing seal 167, as shown in FIG. 8B is held securely between the contoured spring loaded back ring 169 and contoured shoulder 173 of the housing 18. A spring 171 is positioned within the spring loaded back ring 169 to provide the force to hold the firing seal 169 against the shoulder 173. In the set position the sliding firing seal 167 seals the outside diameter of the cup shaped firing piston 36 to retain the air within the firing chamber 62. A seal 177 seals the inside diameter of the spring loaded backup ring 169. The firing piston 36 rider bearing 179 is installed around the outer diameter of the upper portion of the cup shaped firing piston 36.

In an embodiment of the present invention, the width of the ports W extends beyond the outer diameter OD of the cup shaped firing piston 36 as a circumferential groove 175 along the inner diameter of the cylindrical wall 20 of the housing 18 as shown in FIG. 8A. The circumferential groove 175 may be a continuous 360° annular channel that extends through and between the ports providing for as much air as possible to be expelled from the firing chamber with the shortest distance travel of the shuttle assembly shaft 27 improving the overall efficiency of the low pressure air gun 10. The ports 70 are formed as divider ports with strengthening horizontal posts 180 to give the air gun housing 18 rigidity between each of four ports shown in FIG. 8C in cross section of section A-A shown in FIG. 8A.

In operation at pressures lower than 1000 psi, the shuttle assembly shaft 27 accelerates when the air gun 10 is triggered and the bottom outside diameter surface 163 of the cup shaped firing piston 36 moves until it passes the sealing surface of the sliding firing seal 167 as shown in FIG. 8B. The spring loaded backup ring 169 maintains a force on the sliding firing seal 167 to prevent any leakage from around the outer diameter of the cup shaped firing piston 36. Therefore, while moving toward the edge of the ports 165 within the air gun housing 18 no compressed air is released from the compression chamber 30 during the acceleration distance. The reduction of air leakage and lower velocity of air as it accelerates out of the ports 70 at lower pressures reduces the content of high frequencies in the outgoing pulse and differently from conventional high pressure air guns, may reduce cavitation in the water that may disrupt the marine ecostructure and with the objectionable high frequencies may damage the hearing of marine mammals.

In further embodiments as shown in FIG. 9A, the upper portion of the firing chamber 62 is formed with an outer ring 184 and an inner rim 185 having a retainer lip 176 that holds the sliding O-ring firing seal 174. A spring loaded back ring 170 compresses the firing seal 174 against the retainer lip 176. The outer ring 184 of the firing chamber 62 is mounted against a shoulder 182 of the housing 18 and the inner surface 183 of the cup shaped flange 178 of the firing piston 36 seals against the firing seal 174 along the inner rim 185 of the firing chamber 62 creating a channel for the end portion 181 of the cup shaped flange 178 between the inner rim 185 of the firing chamber 62 and the housing 18, as shown in FIG. 9B. The rider bearing 179 positioned along a rear portion of the outer edge of the firing piston 36 creates clearance between the flange 178 and the housing 18 centering the firing piston 36 and guiding the cup shaped flange 178 around the inner rim 185 to seal against the firing seal 174 of the firing chamber 62. The bearing 179 prevents contact of metal on metal of the flange 178 with the housing 18.

As described herein, in the operation of the air gun 10 as a sound source for geophysical seismic studies and oil exploration there may be advantages gained by slowing and/or shaping the rise rate of the initial output pulse. As shown in FIG. 10A, if the edge 172 of the cup shaped flange 178 of the firing piston 36 is formed with a squared nose end portion 181 with radiused corners, air is released through the exhaust ports 70 in direct proportion to the opening distance D as the cup shaped flange 178 moves from left to right when the air gun 10 is fired. In some embodiments of the air gun 10, the rise rate may be slowed and the output characteristics of the output pulse may be adjusted by forming the circumferential annual groove 205 at varying depths and/or by having the groove be of various shapes as shown in FIG. 10B. In further embodiments of the present invention, by sealing the inside surface 183 of the firing piston 36 against the outside diameter of the firing seal 174 of the firing chamber 62, the outer edge 187 of the cup shaped flange 178 may be machined backward at a straight angle, or as a contoured or rounded edge to modify the rise time and shape of the initial output pulse. Adjustments to the length, angle or profile of the outer edge 187 may be changed as desired on alternate cup shaped flanges 178 of the firing piston 36. For example, the flow rate of compressed air as it bursts out through the exhaust ports 70 may be adjusted to slow the rise time by forming the outer edge 187 with an inwards and backwards taper at an angle of 26.3° to the horizontal, as shown in FIGS. 11A and 11B with the ports in a rotated view from FIGS. 10A and 10B.

Figure 12A:
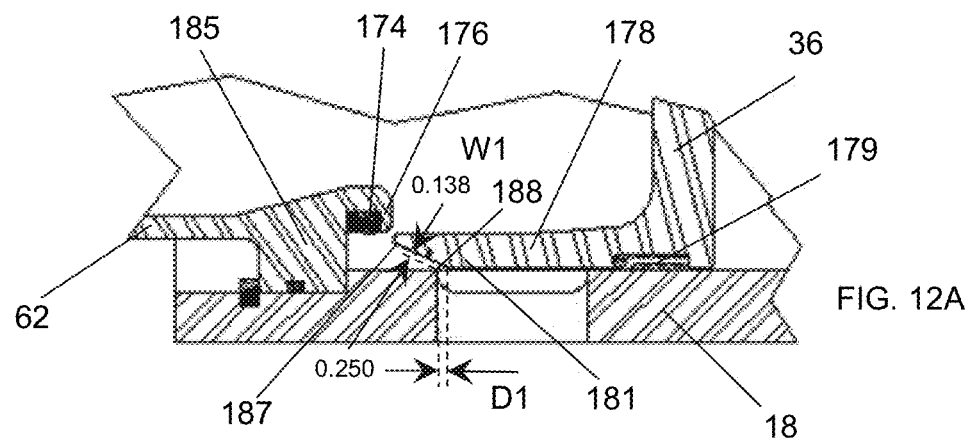
FIG. 12A is an inset of the longitudinal cross sectional view of the further embodiment of the firing chamber and the further embodiment of the cup shaped flange of the firing piston of the air gun of the present invention.
Figure 12B:
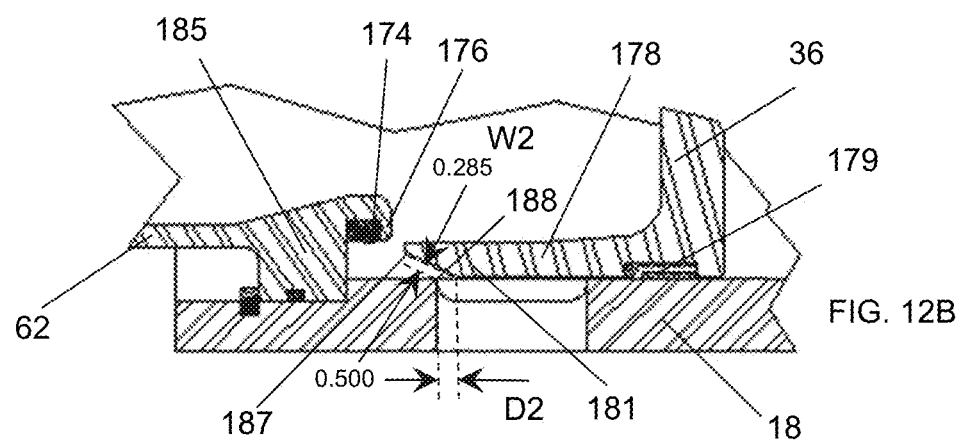
FIG. 12B is an inset of the longitudinal cross sectional view of the further embodiment of the firing chamber and a further embodiment of the cup shaped flange of the firing piston of the air gun of the present invention.
Figure 12C:
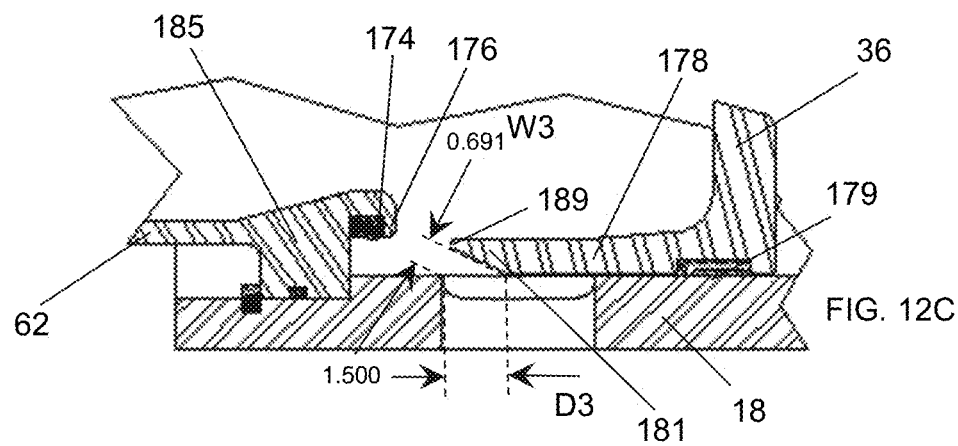
FIG. 12C is an inset of the longitudinal cross sectional view of the further embodiment of the firing chamber and a further embodiment of the cup shaped flange of the firing piston of the air gun of the present invention.
Figure 13A:
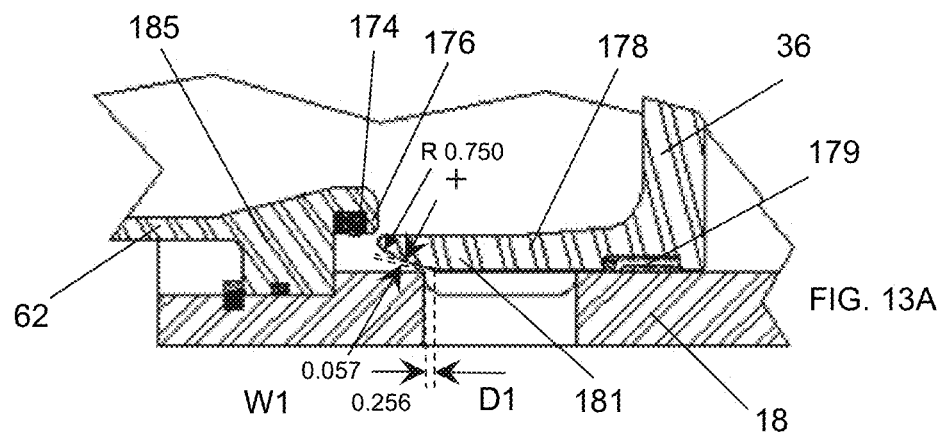
FIG. 13A is an inset of the longitudinal cross sectional view of the further embodiment of the firing chamber and a still further embodiment of the cup shaped flange of the firing piston of the air gun of the present invention.
Figure 13B:
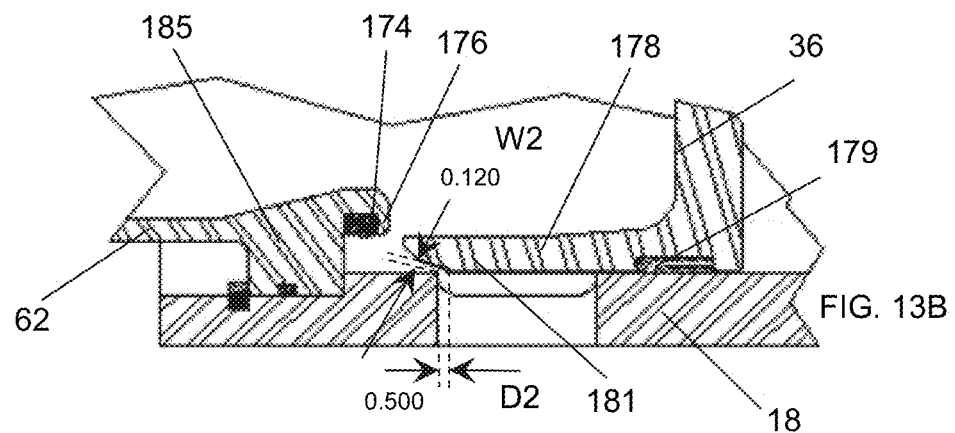
FIG. 13B is an inset of the longitudinal cross sectional view of the further embodiment of the firing chamber and the still further embodiment of the cup shaped flange of the firing piston of the air gun of the present invention.
Figure 13C:
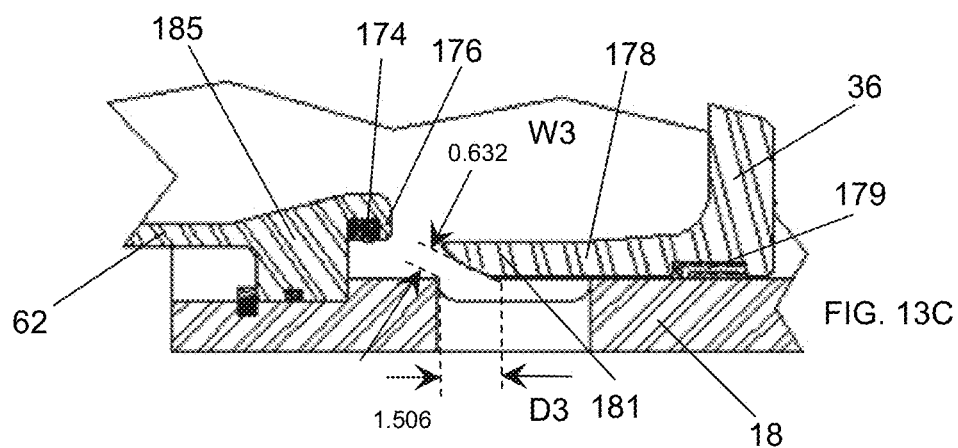
FIG. 13C is an inset of the longitudinal cross sectional view of the further embodiment of the firing chamber and the still further embodiment of the cup shaped flange of the firing piston of the air gun of the present invention.

As the firing piston 36 moves from the set position, as shown in FIG. 11A, to the position shown in FIG. 12A a small circular crack D1 is opened up between the angled surface of the outer edge 187 of the cup shaped flange 178 and the top corner 188 of the first face along the opening edge 165 of the exhaust ports 70. As shown in FIG. 12B, the small circular crack D1 becomes a larger circular opening D2 and then a much larger circular opening D3, as shown in FIG. 11C, as the firing piston 36 of the shuttle assembly shaft 27 moves left to right. However, for an equal distance traveled the area of the circular orifice is only one half of the area as with a cup shaped firing flange 178 with a squared nose end portion 181. For the straight angled surface 187 at the angle of 26.3° to the horizontal, the flow rate of the compressed air flow through the circular orifice is approximately the distance traveled times the mean circumference of the circular orifice divided by two thus slowing the egress of the compressed air and controlling and slowing the rise rate of the air gun pulse until the rounded nose 189 of the cup shaped flange 178 passes the top corner 188 of the first face along the opening edge 165 of the exhaust ports 70. Assuming the cylindrical housing 18 of the air gun has a mean diameter of 25.4 cm (10 in) for all of the illustrated examples. In a first example, the circular orifice for the cup shaped firing flange 178 having the straight angled surface 187 at the angle of 26.3° to the horizontal has a width W1 of 0.351 cm (0.138 in.) when the firing piston 36 of the shuttle assembly shaft 27 moves to a distance D1 of 0.635 cm (0.250 in.) and the circular orifice has a cross-sectional area of 27.9 cm2 (4.33 in2) as shown in FIG. 12A, approximately half of the cross-sectional area at the same distance for the cup shaped firing flange 178 having a squared nose end portion 181. At distance D2 of 1.27 cm (0.500 in.), the circular orifice width W2 is 0.724 cm (0.285 in.) and the cross-sectional area is 61.22 cm2 (9.49 in2) as shown in FIG. 12B and for FIG. 12C at distance D3 of 3.81 cm (1.500 in.), the circular orifice width W3 is 1.76 cm (0.691 in.) and the cross-sectional area is 140 cm2 (21.7 in2). In an alternate configuration, as shown in FIG. 13A, the outer edge 187 of the cup shaped flange 178 is instead of a straight angle a sector of a circle having a radius of 1.91 cm (0.75 in) demonstrating the ability to regulate the flow of compressed air through the exhaust ports 70 at a non-linear rate with the orifice sizes calculated from a mean diameter of 25.4 cm (10 in) for all of the illustrated examples. The cross-sectional area of the circular orifice is 11.5 cm2 (1.79 in2) at a distance D1 of 0.650 cm (0.256 in.) and width W1 of 1.44 cm (0.057 in.) for the circular orifice. At a distance D2 of 1.27 cm (0.500 in.) and width W1 of 0.304 cm (0.120 in.) for the circular orifice for FIG. 13B the cross-sectional area is 24.32 cm2 (3.77 in2) and at a distance D3 of 3.82 cm (1.506 in.) and a width W3 of the circular orifice of 1.61 cm (0.632 in.) the cross-sectional area is 128.09 cm2 (19.85 in2) for FIG. 13C for the same travel distances as the straight angle outer edge shown in FIGS. 12A, 12B and 12C. For air guns having different sized firing chambers and/or for different desired output pulses, changing the profile of the circular radius of the end portion 181, the length of the taper, and/or angle of the outer edge 172 of the cup shaped flange 178 adjustments may be made to the shape and rise time of the output pulse. A tapered nose of the firing flange 178 as described herein may also be used as part of an air gun which does not use an internal port connecting circumferential annular groove as in the air gun described in U.S. Pat. No. 8,223,591 to the same inventor where the back side 191 of the cup shaped firing flange 178 of the firing piston 36 facing the operating chamber 30 of the air gun reciprocates when operated within the volume of air of the air cushion chamber 50 essentially at a pressure equal to that of the surrounding water in which the air gun is operated.

Figure 14:
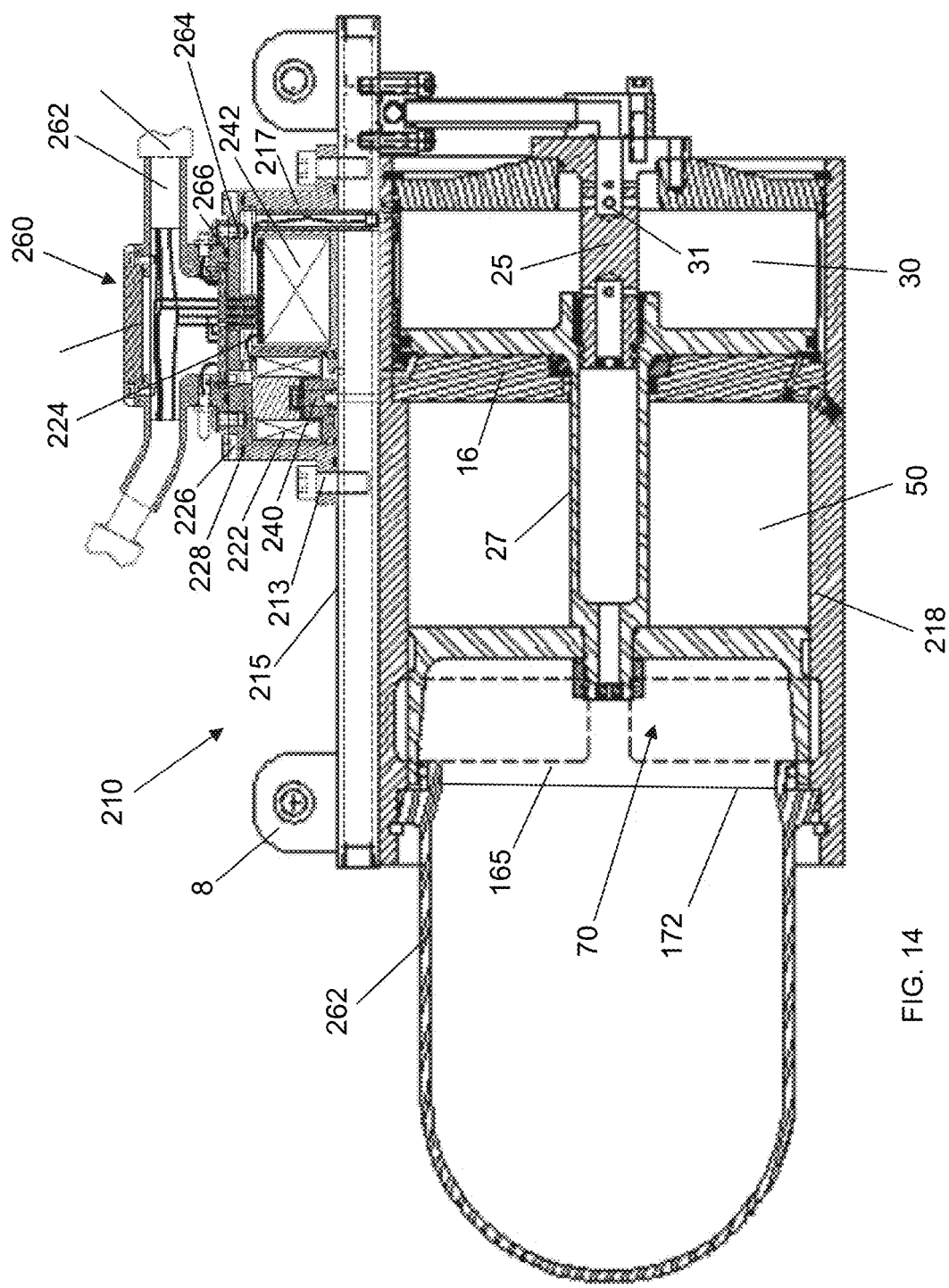
FIG. 14 is a cross-sectional view of a further embodiment of an air gun having a hollow in-line communications connector assembly mounted on the top of the solenoid valve and firing circuit housing assembly.
Figure 15:
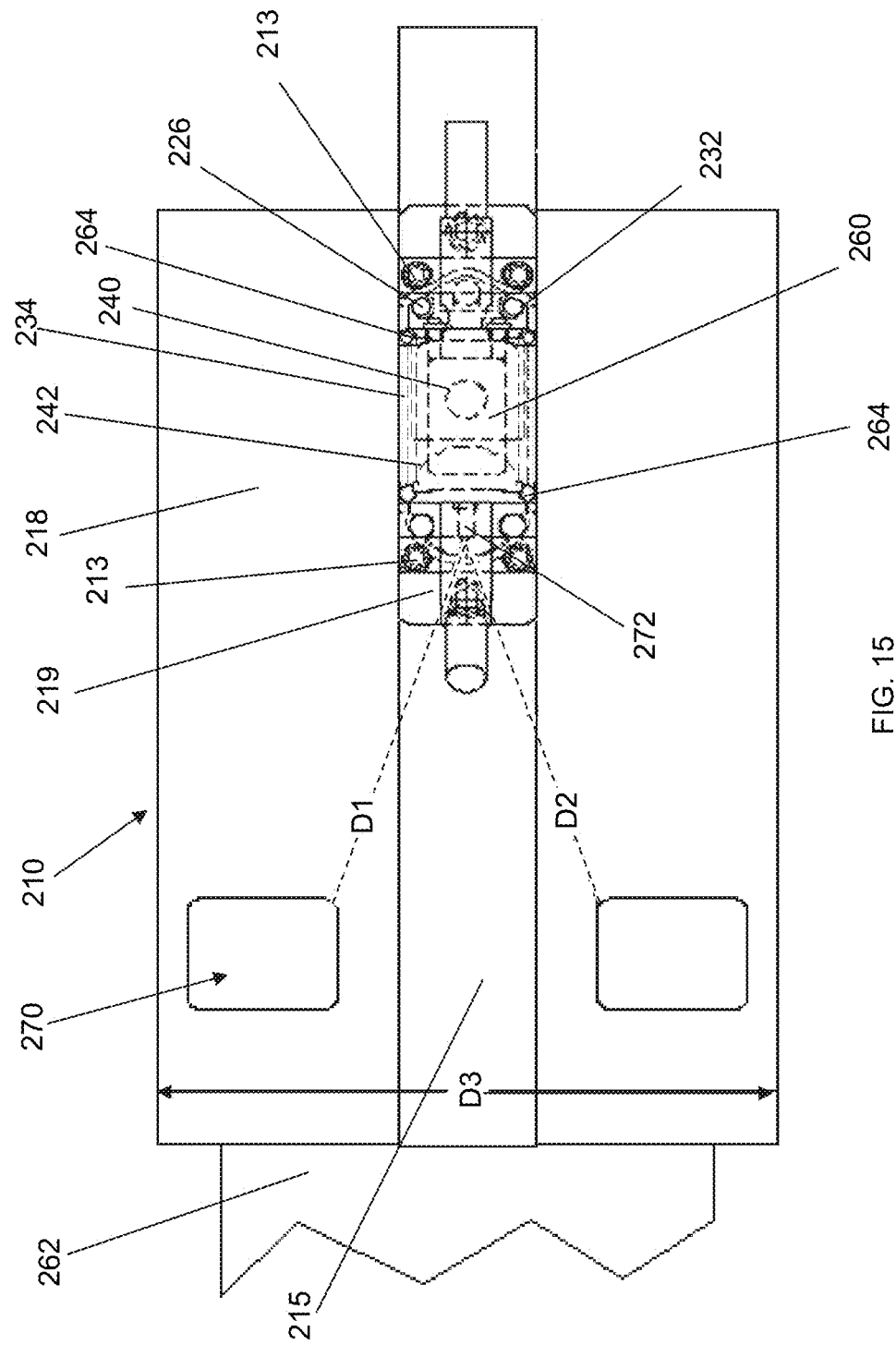
FIG. 15 is a top view of an air gun with the in-line communications connector assembly mounted on the top of the air gun illustrating the positions of the hydrophone the water pressure and water temperature sensors.

In further embodiments of the air gun 210 of the present invention, the brazed in place reinforcing backbone 215 attached to the air gun housing 218 provides a flat top surface for mounting an air gun triggering solenoid valve housing 217 using mounting bolts 213 as shown in FIG. 14. Within the housing 217, an analog or digitally controlled firing circuit 242 produces an electric firing pulse to energize the solenoid valve assembly 240 through electrical leads 224. The solenoid valve assembly 240 has a cover 222 held in place with cover mounting bolts 226 and sealed with perimeter O-ring seal 228 at threaded plug 232 that allows for empty spaces to be filled with potting material before mounting an integrated communications connector 260. The housing 217 has a mounting flange 234 on its flat top surface for the attachment of the integrated communications connector 260 as shown in a top view of the air gun 210 in FIG. 15. The integrated communications connector 260 is secured by bolts 264 and sealed with perimeter O-ring seal 266.

The hollow in-line integrated communications connector 260 has a hydrophone 272 a water pressure sensor 274 mounted adjacent to a water temperature sensor 276. The temperature sensor 276 monitors the water temperature and the pressure sensor 274 monitors the water pressure that corresponds to the air gun 210 operating depth. The hydrophone 272 is conveniently located facing the air discharge ports 270 symmetrically with no structures between the ports 270 and the hydrophone 272 thus being able to faithfully report the acoustic signature of the air gun pulse. The hydrophone 272 is located symmetrically from top front corners of the air gun pulse output ports 270 making distance D1 equal to distance D2 providing an accurate reception of the near-field signature of the air gun pulse where the equal distances D1 and D2 are also less than the diameter D3 of the air gun housing 218.

Figure 16:
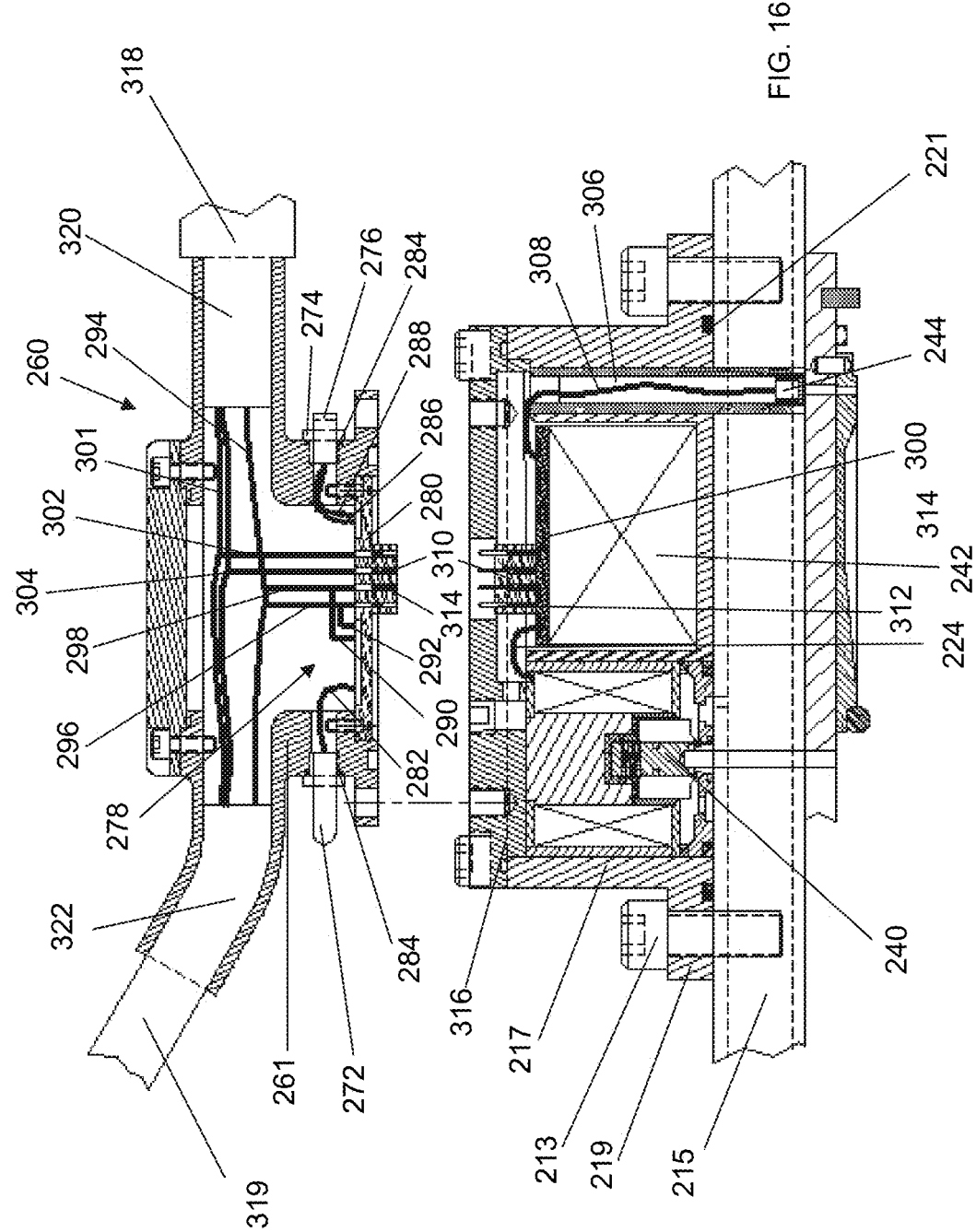
FIG. 16 is a cross-sectional view of the in-line communications connector assembly with the solenoid valve and firing circuit housing assembly.

As shown in FIG. 16, the hydrophone 272 is electrically connected to circuit board 280 by electric lead wires 282 and sealed by the use of O-ring seals 284. The pressure sensor 274 and temperature sensor 276 are similarly sealed using O-ring seals 284 and connected to the circuit board 280 using electric lead wires 286 and 288. There is a rectangular shouldered recess 278 within the integrated communications connector housing 261 in which electronic circuit board 280 is located for processing the signals from the hydrophone 272, the water pressure sensor 274 and the water temperature sensor 276. The electronic circuit board 280 also controls the flow of electric power to the firing circuit 242 through electric lead wires 290 and 292 and the main electric power cable 294 carries electric power to power leads 296 and 298 to supply electricity to the communications connector circuit board 280 and to the circuit board 300 for the firing circuit 242. The firing circuit board 300 receives signals for firing the air gun 210 through a main communication cable 301 to communication lines 302 and 304 and transmits signals to the solenoid valve 240 through electric wire lead 224 for firing. When the air gun 210 fires an air pressure spike enters the time break passage 306 as in other air guns such as air gun U.S. Pat. No. 8,223,591 and acts upon time break transducer assembly 244 causing an electric pulse signal. The firing circuit board 300 processes the time break signal from time-break transducer assembly 244 through electric lead wire 308 and transmits the electric pulse signal through communication lines 302 and 304.

The electronic communication lines 302 and 304 carry and communicate digital or analog signals to and from electronic boards 280 and 300 to digital (such as a CAN BUS electronic communication transmission system circuits) or analog electronic communication system circuits from and to the exploration vessel towing and controlling the air gun or air guns for seismic exploration. A two part multi pin connector 310 with male pins 312 on the bottom half and female sockets 314 on the top for example, enable the connector assembly 310 to be plugged into and electrically connected or removed from the valve cover 316 of the solenoid valve housing 317 without disturbing any electrical wiring.

Figure 17:
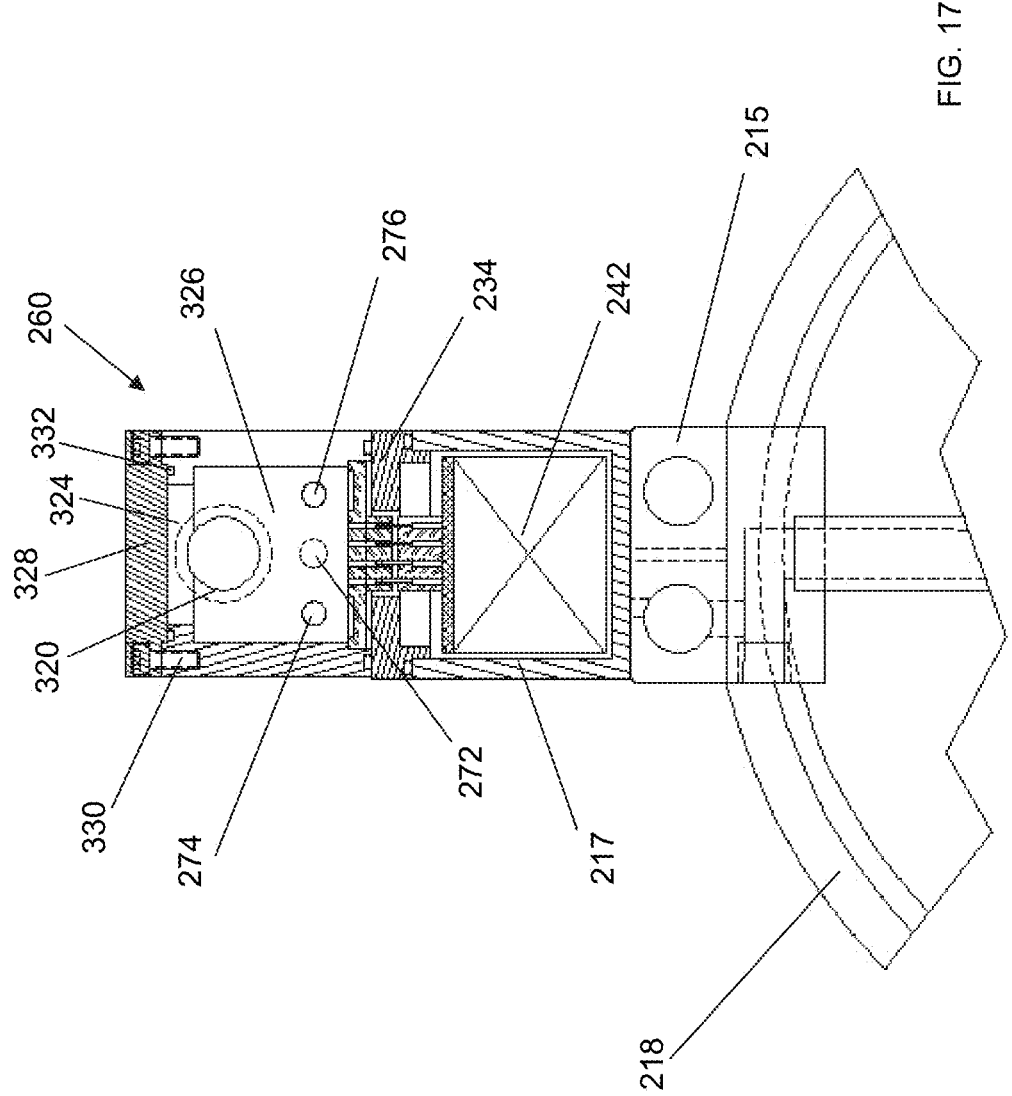
FIG. 17 is a front elevation view of the in-line communications connector assembly mounted on the top of the solenoid valve and firing circuit housing assembly.

A heavy duty rough service electric cable assembly 318 coming from the exploration vessel is secured and fluid sealed at the straight tubular front end 320 of the connector assembly 260. A similar type of rough service cable assembly 319 combines the main electric power cable 294 with the main communications cable 301 in a bundle with the power wire leads 296 and 298 and communications lines 302 and 304 extending from the cable assembly 319 within the integrated communications connector housing 261. The cable assembly 319 shields and seals the main cables 294 and 301 and extends the cables 294 and 301 from the housing 261 through the rigid tubular back end 322 of the connector assembly 260. The back end 322 of the connector assembly 260 may curve upward in order to keep the cable assembly 319 a safe distance above the area where the air bubble comes from the air gun ports 270 when the air gun is fired to prevent the bubble or bubble pulse from damaging the cable assembly 319. As shown in FIG. 17, a rectangular port 324 allows access to the electric connections and wires within the connector chamber 326 and for filling the chamber with potting material to prevent movement of the wires and cables during operation of the air gun. A cover 328 is secured by cap screws 330 and the cover 328 is sealed with O-ring seal 332. Using mounting bolts 213 and sealed with O-ring seal 221, the mounting flange 219 of the solenoid valve housing 217 is secured to the flat top surface of the backbone 215 that is vacuum brazed to the air gun housing 218.

Figure 18:
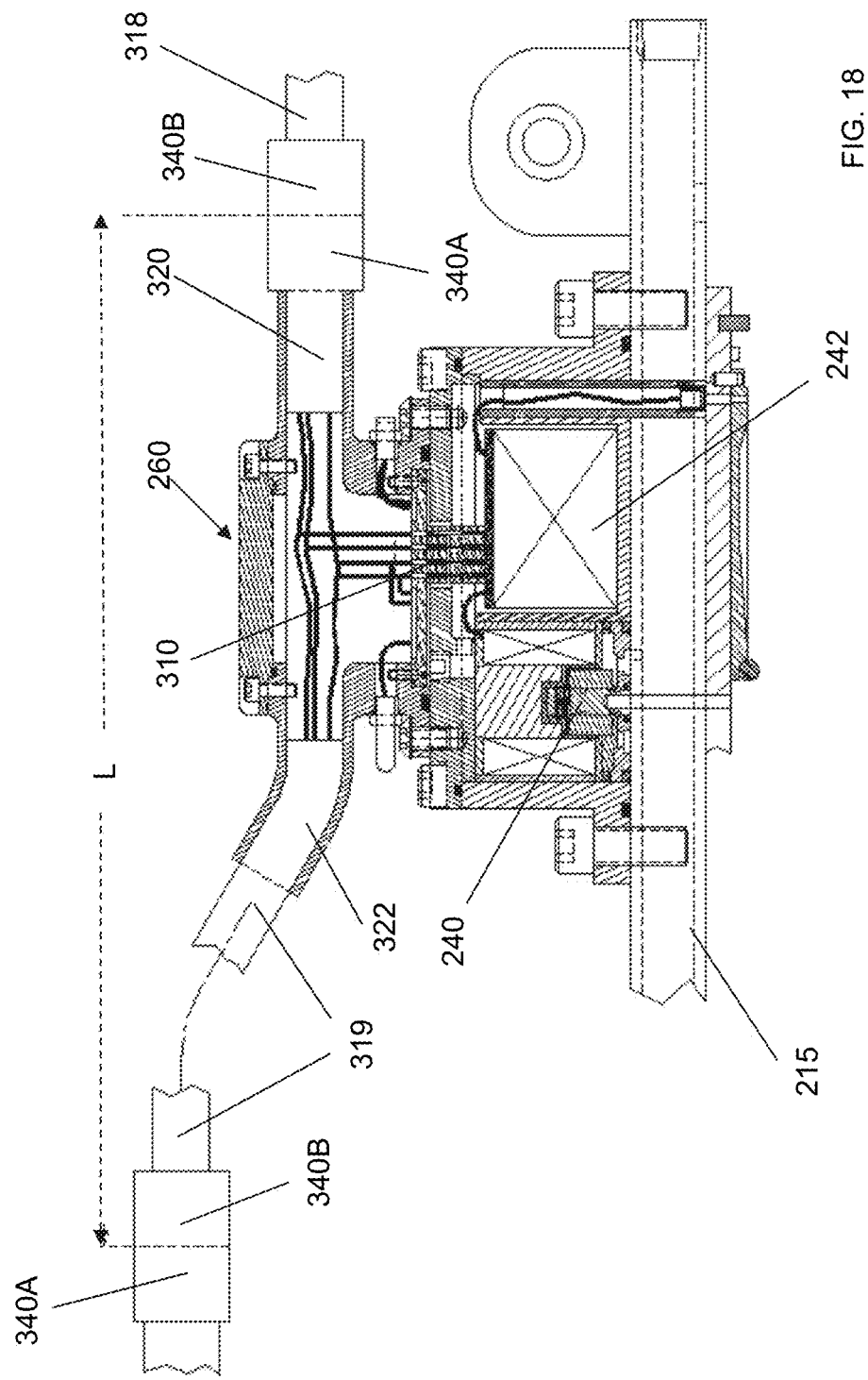
FIG. 18 is a cross-sectional view of the in-line communications connector assembly with cable assembly mounted on the top of the solenoid valve and firing circuit housing assembly.

As shown in FIG. 18, a heavy duty multi-pin sealed in-line electrical connector assembly 340A and 340B having the correct pin configuration to service the cable assembly 318 is shown on the front end 320 of the integrated communications connector assembly 260. The integrated communications connector assembly 260 with the attached cable assembly 319 may be of any appropriate length with the cable assembly 319 extending to a second heavy duty multi-pin sealed in-line electrical connector assembly 340A and 340B. The length of the cable assembly 319 with the in-line connector assembly 260 determines the spacing distance L between separate air guns in an air gun array thus providing for the air guns with the chosen cable and connector lengths to be modular interchangeable parts within the air gun array system making it possible to replace defective air guns or cable sections and redeploy the air gun system without the time consuming need to operate and repair the internals of a defective air gun.

The present invention as described here-in is an improvement over designs of the prior art including the design in U.S. Pat. No. 8,223,591 to the same inventor because commonly the solenoid valve housing including the firing circuit and time break transducer is hard wired through for example a multipurpose manifold assembly making those two parts captive to each other and thus making it necessary to remove and replace both components even if only one would be in need of replacing. The present design allows either the solenoid valve assembly 240 or the connector assembly 260 to be changed independently of the other using the multi-pin connector 310 to separate the communications connector assembly 260 from the solenoid valve housing 217 without disturbing any of the wired assemblies and connections. Another improvement of the integrated communications connector assembly 260 is the inclusion of the near-field hydrophone sensor 272, the water pressure sensor 274, and temperature sensor 276 within one connector assembly providing for ease in mounting sensors to the air gun 210 and in repair and replacement of sensors, the complete connector 260 and/or the complete air gun 210 in the case of failure of components.

Although specific embodiments of the invention have been disclosed herein in detail, it is to be understood that this is for purposes of illustration. This disclosure is not to be construed as limiting the scope of the invention, since the described embodiments may be changed in details as will become apparent to those skilled in the art in order to adapt the low pressure air guns to particular applications, without departing from the scope of the following claims and equivalents of the claimed elements.

What is claimed is:

1. A low pressure air gun for seismic exploration, comprising:
    an air gun having a firing chamber pressurized to below 1000 psi;
    the air gun comprising a housing having an operating chamber, the operating chamber comprising a speed controller having a fluted sleeve; and
    wherein the rise time of the sound pulse is slowed to reduce high frequencies.

2. The low pressure air gun for seismic exploration of claim 1 comprising:
    a shuttle assembly having a shaft, the shaft having an operating flange within the operating chamber and a firing piston.

3. The low pressure air gun for seismic exploration of claim 1 comprising at least one discharge port having a width that extends beyond the outer diameter of the firing piston.

4. The low pressure air gun for seismic exploration of claim 1 comprising a firing seal preventing air leaks between the firing piston and housing.

5. The low pressure air gun for seismic exploration of claim 1
    wherein the rise time of the sound pulse is adjusted by modifying the geometry of one of at least the length, width, depth, slope and shape of grooves of the fluted sleeve.

6. The low pressure air gun for seismic exploration of claim 1 wherein the firing piston having a cup shaped flange.

7. The low pressure air gun for seismic exploration of claim 1 comprising an air cushion chamber.

8. The low pressure air gun for seismic exploration of claim 7 wherein the air cushion chamber having a length that is at least 1.2 times the length of the operating chamber.

9. The low pressure air gun for seismic exploration of claim 7 comprising shaft seal rings and a retainer ring installed to seal the operating chamber from the air cushion chamber.

10. The low pressure air gun for seismic exploration of claim 7 wherein the shuttle assembly shaft having a hollow bore through the shaft and cylindrical bearings and piston rings within the hollow bore of the shuttle assembly shaft.

11. The low pressure air gun for seismic exploration of claim 10 comprising a shuttle assembly support spindle inserted within the hollow bore.

12. The low pressure air gun for seismic exploration of claim 1 comprising a trigger air passage of a length less than the radius of the shuttle assembly operating flange through a wall of the housing directly connecting a solenoid valve to the operating chamber.

13. The low pressure air gun for seismic exploration of claim 1 comprising snap rings to attach a firing chamber and an operating chamber head to the housing.

14. The low pressure air gun for seismic exploration of claim 1 further comprising:
    a solenoid valve housing detachable from the housing, the solenoid valve housing enclosing one of at least a solenoid operated air gun firing valve and a firing circuit.

15. The low pressure air gun for seismic exploration of claim 1 comprising an integrated connector detachable from the air gun.

16. An air gun for seismic exploration, comprising:
a housing having an operating chamber and an air cushion chamber;
a fluted sleeve installed within the operating chamber;
a shuttle assembly having a shaft, the shaft having an operating flange on one end within the operating chamber and having a firing piston on an opposing end within the air cushion chamber;
a plurality of discharge ports formed within the housing;
a firing chamber pressurized to below 1000 psi.; and
wherein firing the air gun releases a sound pulse through the plurality of discharge ports and the rise time of the sound pulse is slowed to reduce high frequencies.

17. The air gun for seismic exploration of claim 16, comprising an air cushion chamber of a length along the shuttle axis that is at least 1.2 times the length within the operating chamber along the shuttle axis as measured from a face of the operating flange to an operating chamber head.

18. The air gun for seismic exploration of claim 16, comprising at least one circumferential annular groove connecting the plurality of discharge ports; and wherein the annular groove may be varied in depth or shape to control the speed of the shuttle assembly and the rise time from zero pressure to peak pressure of the primary pressure pulse.

19. The air gun for seismic exploration of claim 16 further comprising a speed controller, the speed controller comprising:
a piston ring installed to the outer diameter of the operating flange; and
when triggered the operating flange moves the piston ring over the fluted sleeve to control the speed of the shuttle assembly and the rise time from zero pressure to peak pressure of the primary pressure pulse.

20. The air gun for seismic exploration of claim 19 wherein the speed controller fluted sleeve having grooves and the slope of the rise time of the primary pressure pulse is adjusted by modifying the geometry of one of at least the length, width, depth, slope and shape of the grooves.

21. The air gun for seismic exploration of claim 16 further comprising a fluid filled speed controller.

22. The air gun for seismic exploration of claim 16 further comprising snap rings to attach the firing chamber and the operating chamber to the housing.

23. The air gun for seismic exploration of claim 16 further comprising a backbone brazed on top of the housing, the backbone having a flat mounting surface for a solenoid operated air gun firing valve.

24. The air gun for seismic exploration of claim 23 further comprising a trigger air passage directly through the backbone to the operating chamber.

25. The air gun for seismic exploration of claim 23 further comprising a solenoid valve housing detachable from the reinforcing backbone, the solenoid valve housing enclosing one of at least a solenoid operated air gun firing valve and a firing circuit.

26. The air gun for seismic exploration of claim 23 further comprising a solenoid valve housing brazed to the reinforcing backbone.

27. The air gun for seismic exploration of claim 23 further comprising an integrated connector detachable from a solenoid valve housing, the solenoid valve housing detachable from the reinforcing backbone, the solenoid valve housing enclosing one of at least a solenoid operated air gun firing valve and a firing circuit.

28. The air gun for seismic exploration of claim 16 further comprising an integrated connector detachable from the air gun.

29. The air gun for seismic exploration of claim 16 further comprising a bulkhead wall separating the operating chamber and the air cushion chamber, the bulkhead wall is brazed in place to the housing.

30. The air gun for seismic exploration of claim 16 further comprising shaft seal rings and a retainer ring to seal the operating chamber from the air cushion chamber.

31. The air gun for seismic exploration of claim 16 wherein the firing piston having a firing seal preventing air leaks between the housing, firing chamber and air cushion chamber until the air gun is triggered and air is released through the plurality of discharge ports.

32. The air gun for seismic exploration of claim 16 wherein the firing piston having a cup shaped flange and the firing chamber having a firing seal on the inside diameter of the cup shaped flange preventing air leaks between the housing, firing chamber and air cushion chamber until the air gun is triggered and air is released through the plurality of discharge ports.

33. The air gun for seismic exploration of claim 32 wherein the inside diameter of the cup shaped flange unseals from the firing seal of the firing chamber in a direction opposite to the direction in which the compressed air within the firing chamber is acting upon the sliding seal.

34. The air gun for seismic exploration of claim 32 wherein the cup shaped flange of the firing piston having a tapered edge and the character of the rise time of the pressure pulse is adjusted by modifying the geometry of one of at least the length, width, slope and shape of the tapered edge.

35. The air gun for seismic exploration of claim 16 wherein the plurality of discharge ports having at least one horizontal post divider and the ports extending beyond the outer diameter of the cup shaped firing piston, said ports pointing outwardly opposite each other and horizontally away from the center line of the air gun.

36. A method of producing sound pulses from an air gun, comprising:
pressurizing a firing chamber of an air gun to below 1000 psi;
sealing a cup shaped flange of a firing piston along an inside diameter;
firing the air gun;
expelling as much air as possible from the firing chamber for the shortest distance of travel of a shuttle assembly of an air gun; and
slowing the rise time of the sound pulse to reduce high frequencies.

37. The method of producing sound pulses from an air gun of claim 36, comprising:
installing a bulkhead wall within a housing to separate an operating chamber from an air cushion chamber;
inserting a shuttle assembly having a shaft through an opening in the bulkhead wall, the shuttle assembly shaft having an operating flange on an end of the shaft within the operating chamber and having a firing piston on an opposing end within the air cushion chamber;
forming a plurality of ports within the housing.

* * * * *